Jan. 27, 1942.	J. W. BRYCE	2,271,248
CALCULATING MACHINE
Filed March 1, 1928 16 Sheets-Sheet 1

Jan. 27, 1942.  J. W. BRYCE  2,271,248
CALCULATING MACHINE
Filed March 1, 1928   16 Sheets-Sheet 2
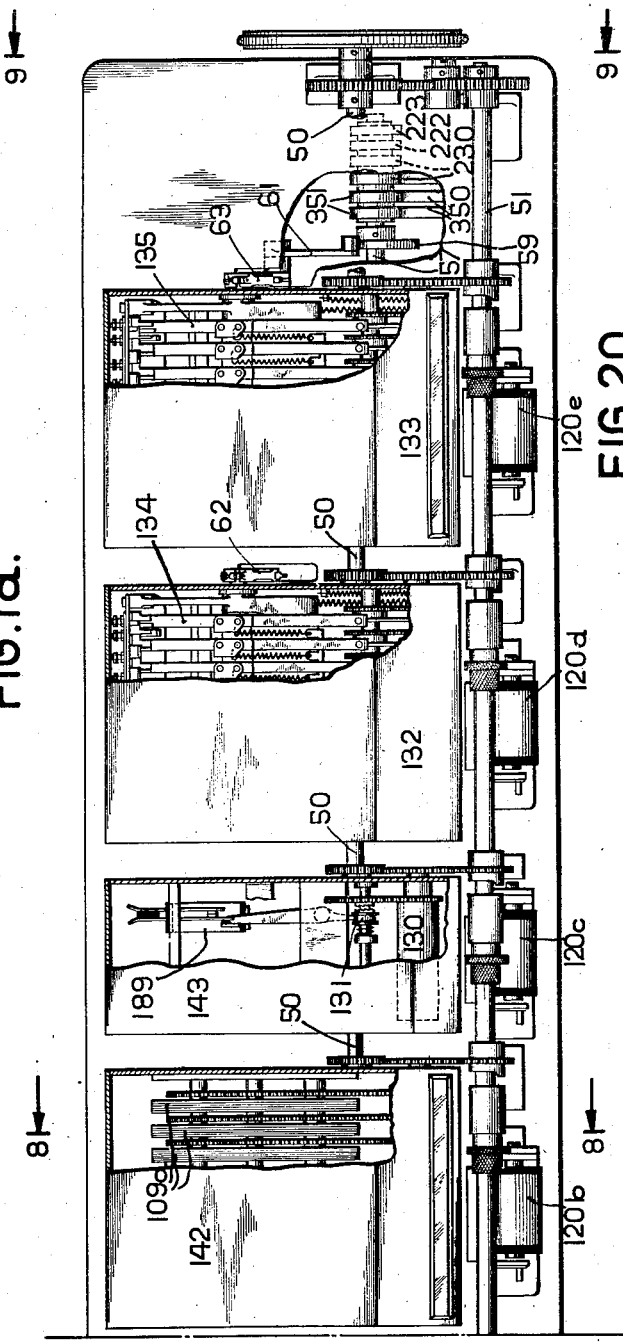
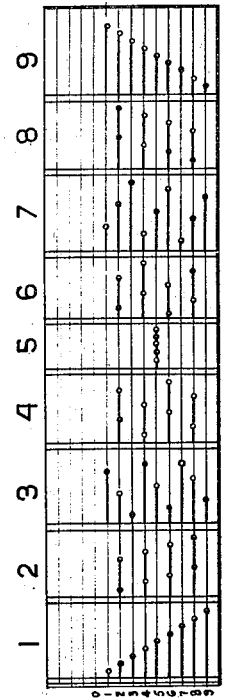
Inventor
James W. Bryce
By his Attorneys
Cooper, Kerr & Dunham

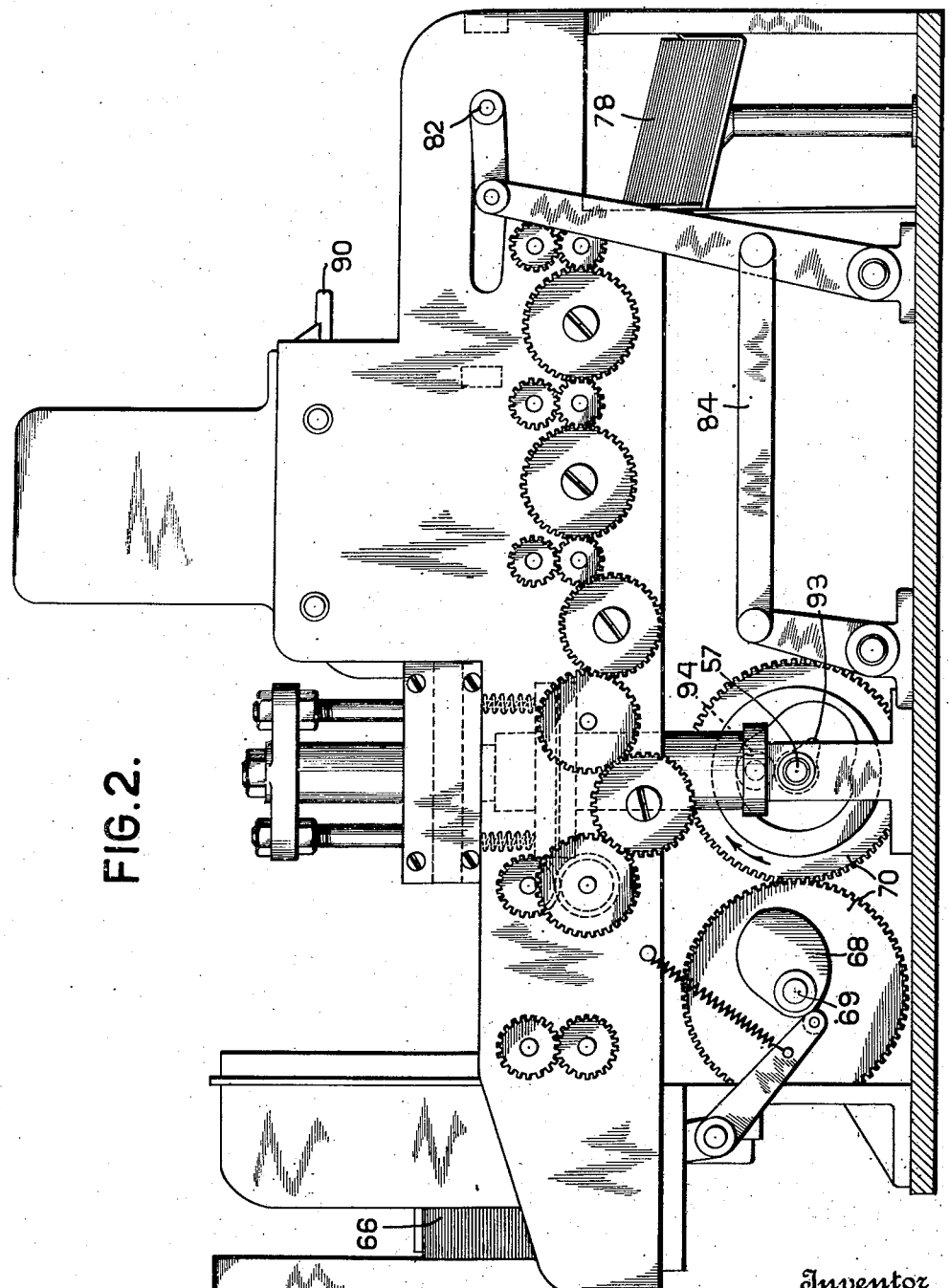

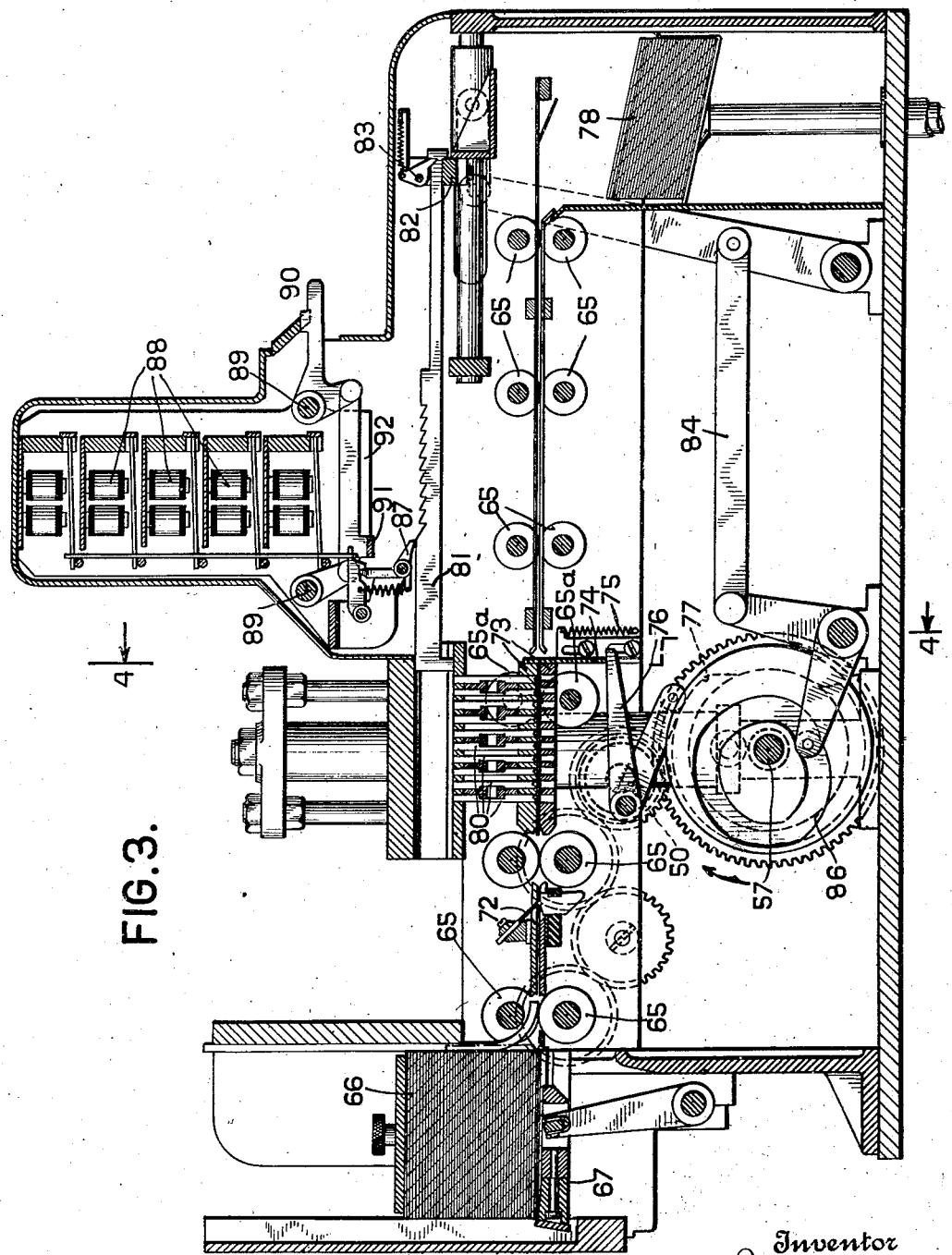

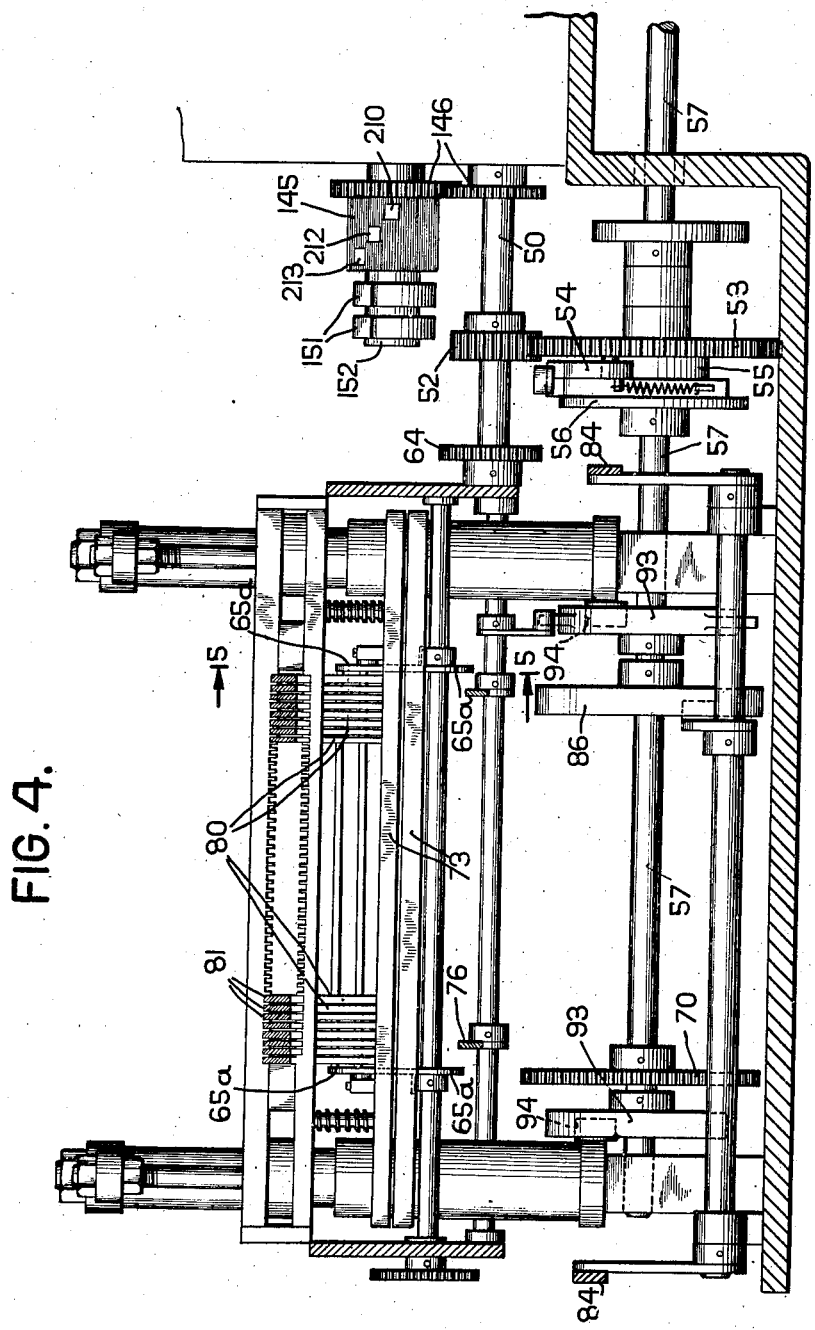

Jan. 27, 1942.  J. W. BRYCE  2,271,248
CALCULATING MACHINE
Filed March 1, 1928    16 Sheets-Sheet 7

Inventor
James W. Bryce
By his Attorneys
Cooper, Kerr & Dunham

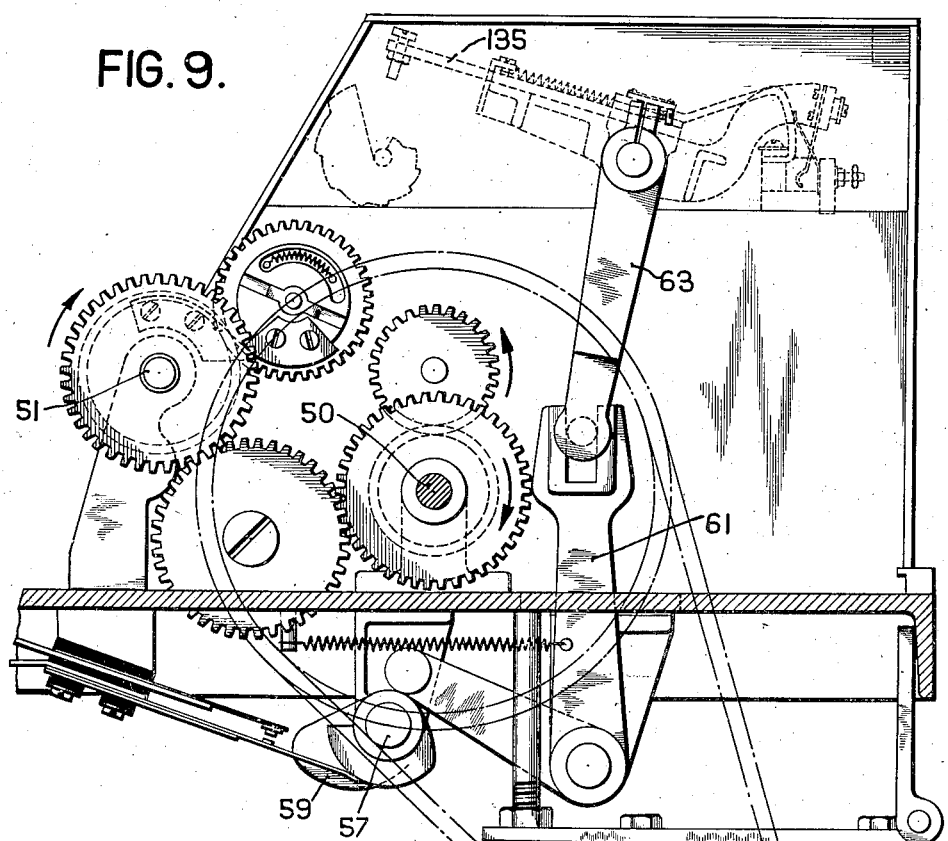
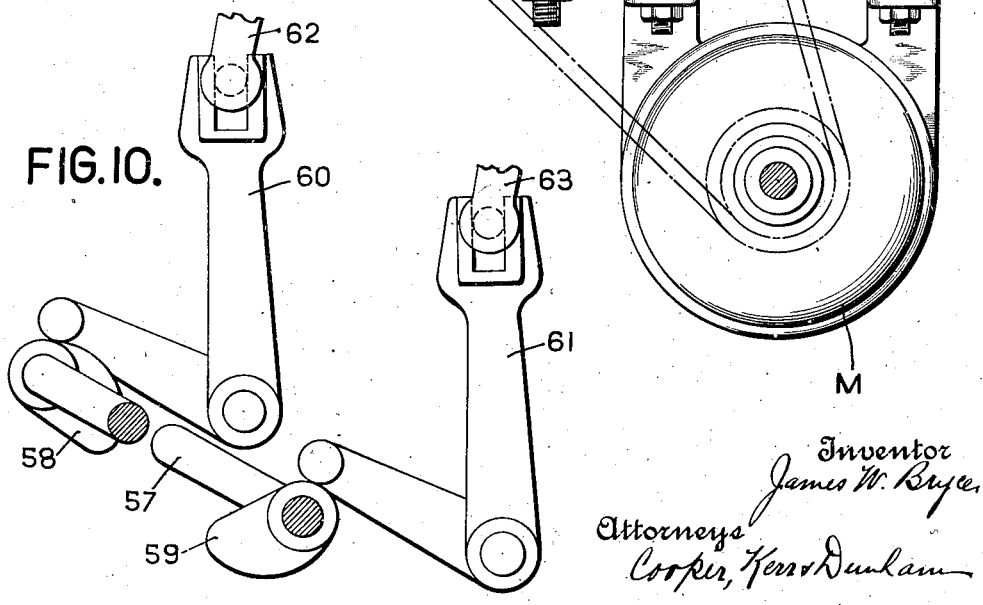

Jan. 27, 1942.  J. W. BRYCE  2,271,248
CALCULATING MACHINE
Filed March 1, 1928  16 Sheets-Sheet 9

Inventor
James W. Bryce
By his Attorneys
Cooper, Kerr & Dunham

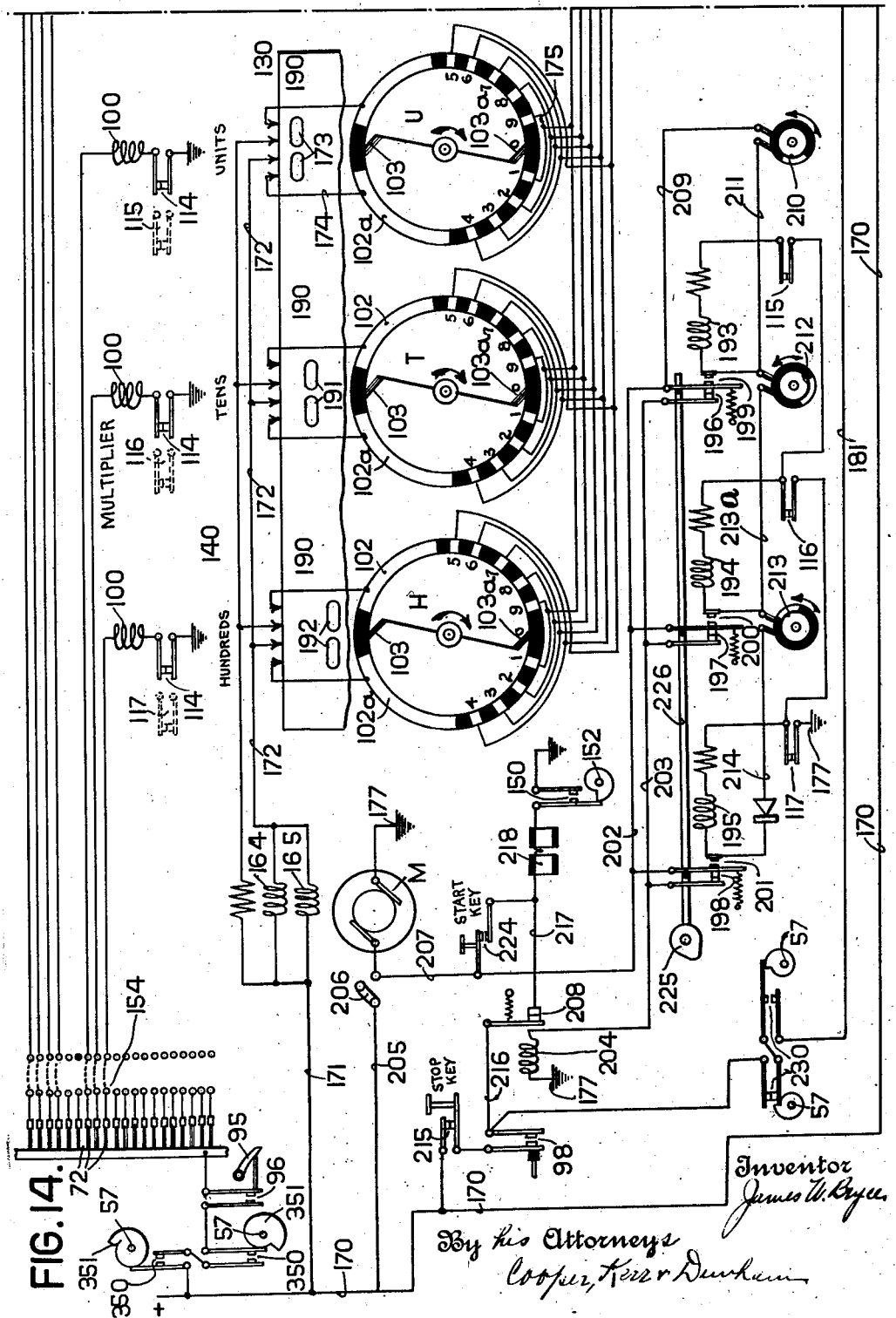

Jan. 27, 1942.  J. W. BRYCE  2,271,248
CALCULATING MACHINE
Filed March 1, 1928   16 Sheets-Sheet 11
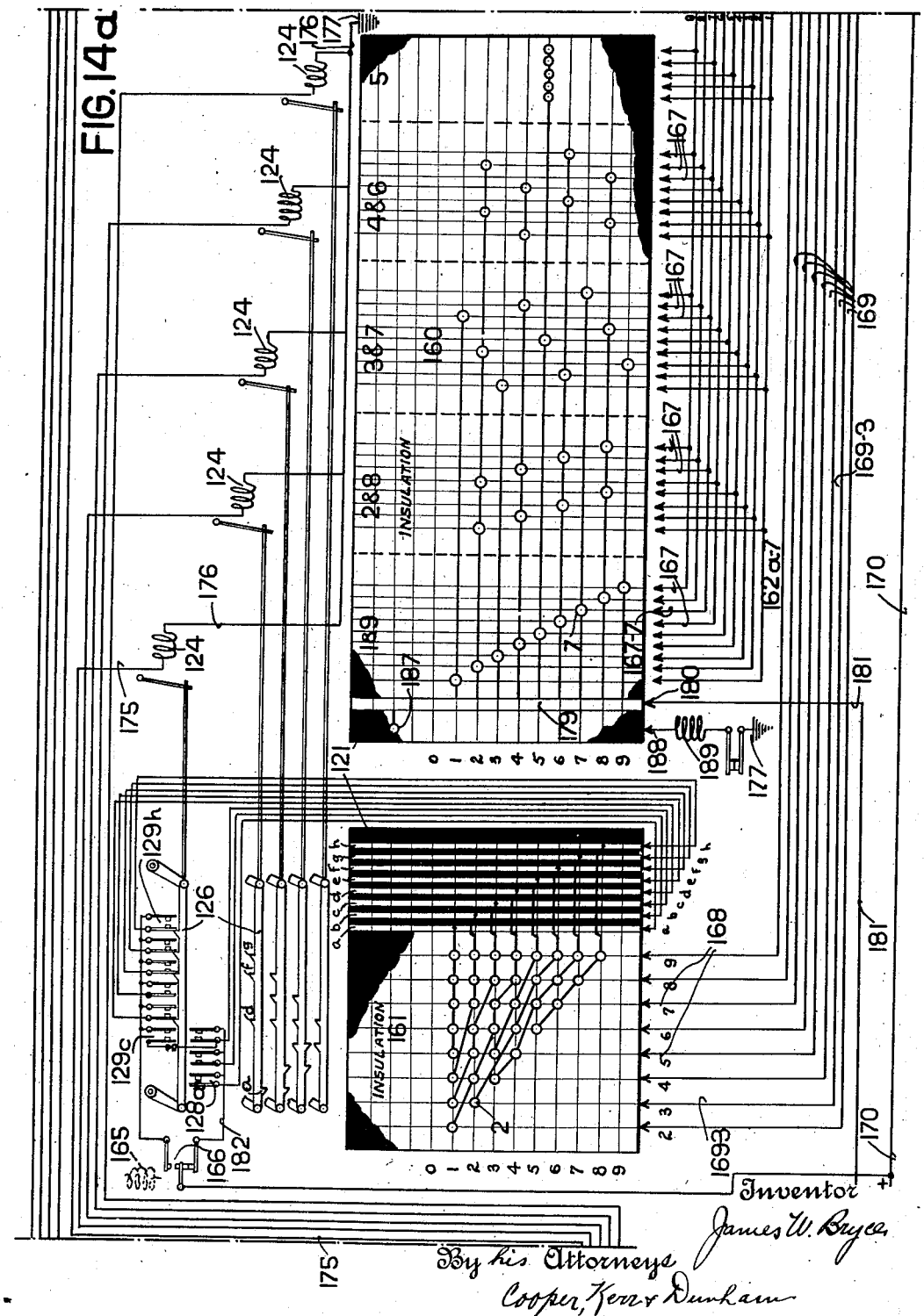

FIG.14b.

Jan. 27, 1942.  J. W. BRYCE  2,271,248
CALCULATING MACHINE
Filed March 1, 1928  16 Sheets-Sheet 13
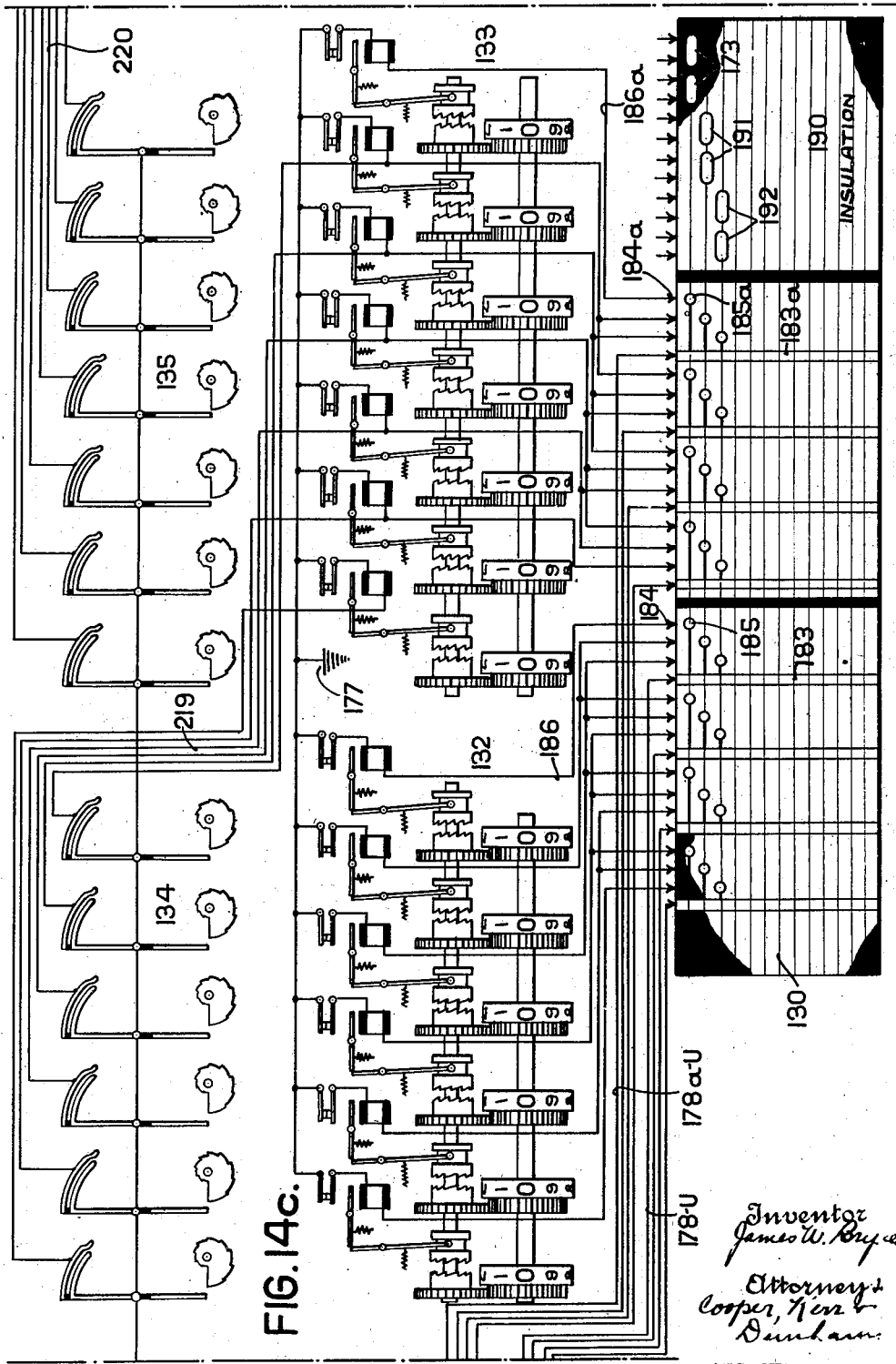

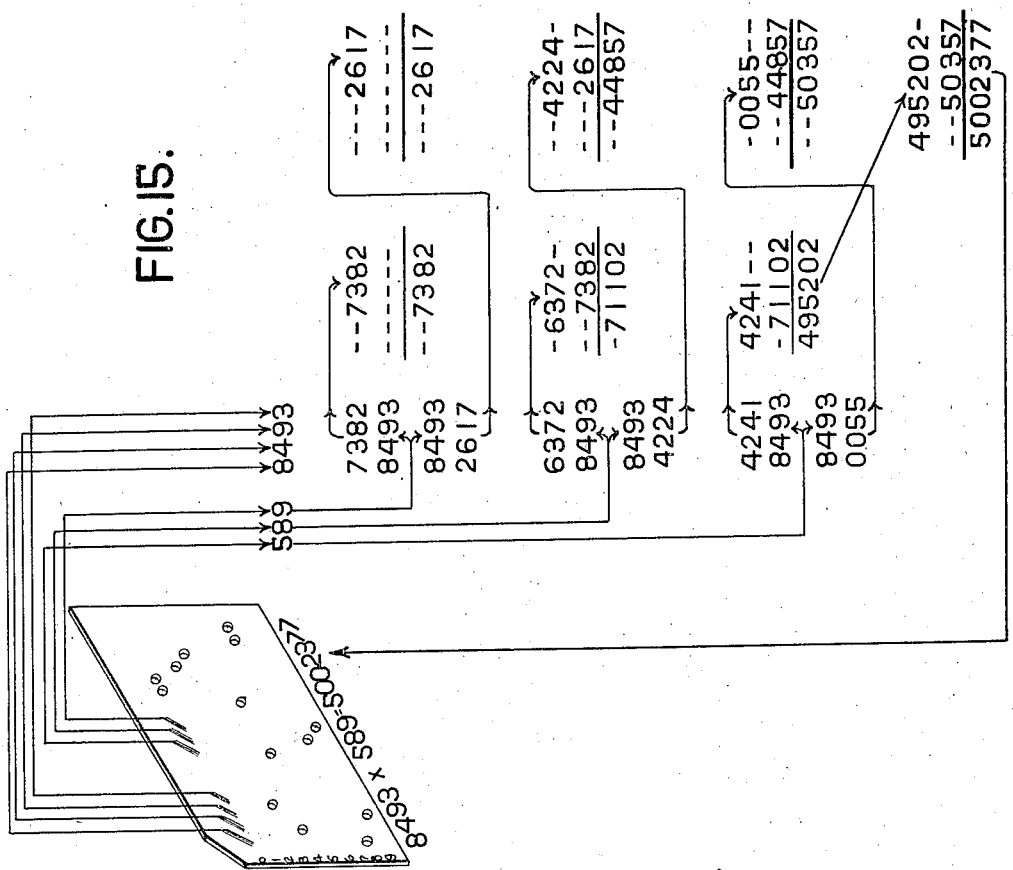
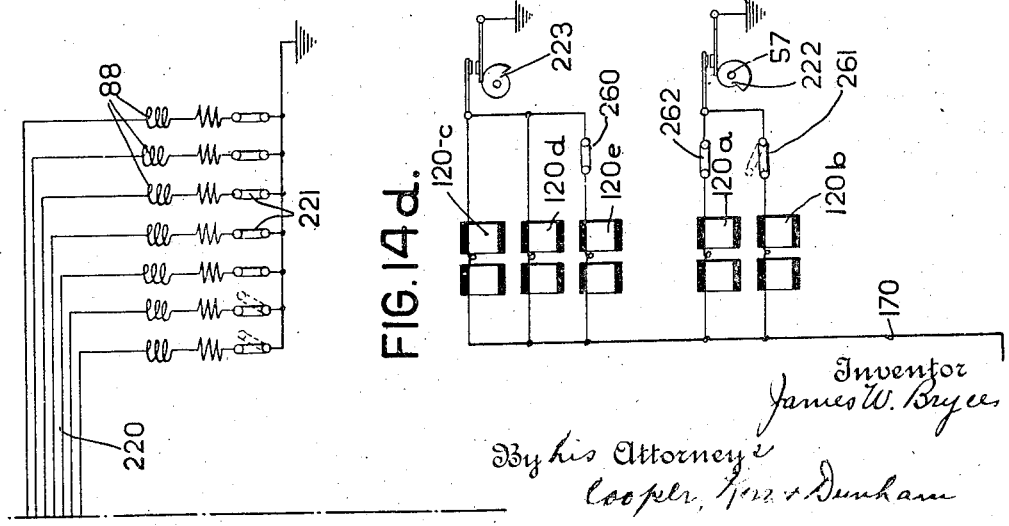

Jan. 27, 1942. J. W. BRYCE 2,271,248
CALCULATING MACHINE
Filed March 1, 1928  16 Sheets-Sheet 16

Inventor
James W. Bryce
By his Attorneys
Cooper, Kerr & Dunham

Patented Jan. 27, 1942

2,271,248

UNITED STATES PATENT OFFICE 2,271,248

CALCULATING MACHINE

James W. Bryce, Bloomfield, N. J., assignor, by mesne assignments, to International Business Machines Corporation, New York, N. Y., a corporation of New York Application March 1, 1928, Serial No. 258,165

49 Claims. (Cl. 235—61.10)

This invention relates to improvements in calculating machines and more particularly, the invention is directed to improvements in multiplying machines.

One of the objects of the present invention is to provide a multiplying machine which is capable of effecting computations at a very rapid rate.

A further object resides in the provision of a machine which will effect computations which have heretofore required manual intervention or control, without such manual manipulation or control. Among such manual operations which are dispensed with in the present machine there may be mentioned the entry of factors and the reading out and recording the result. These and other operations, as will be hereinafter described, are effected automatically and without manual intervention.

A further object of the present invention resides in the provision of a machine having improved means for entering the factors therein. To speed up an entering operation provision is made to enter both factors concurrently and furthermore provision is made for entering the various denominational order amounts of each of the factors also concurrently.

Accordingly, an object of the present invention resides in the provision of a novel form of calculating machine in which the entry of the factors and the multiplication thereof may be effected more rapidly than in previous machines of this class.

A further object of the present invention resides in the provision of a machine with means for automatically and variably adjusting the calculating or integrating cycles of the machine in accordance with the size and character of the computation being made.

A further object resides in the provision of means for adjusting such integrating cycles automatically without manual setting or adjustment and without changing the construction so that the machine is capable of handling large sized problems or smaller sized problems in such a way that the cycle of the machine is automatically coordinated to the requirement of the problem being solved.

Further objects of the present invention reside in the provision of a machine in which a plurality of computations may be effected successively and automatically one after the other.

Further objects of the present invention reside in the provision of a construction whereby coordinated accumulating operations may be effected as well as multiplying operations.

A further object of the present invention resides in the provision of a construction which is adapted to utilize electricity for controlling various computing multiplying and integrating operations.

At the present time it is the common practice to record data by means of perforations upon records. Such records may be in the form of separate tabulating cards or in the form of a perforated strip record. After such records have been perforated they are introduced into record controlled accounting machines and therein provision is made for accumulating, printing and otherwise deriving the perforated data from the records.

Heretofore in cases where multiplications have been desired of amounts preperforated upon such records, such multiplications have been effected by mental operations or by means of separate multiplying machines which have been manipulated by the operator to first obtain the multiplication. Thereafter the product in some cases has been written on the record and afterwards punched thereon by a punch operator and in other cases the multiplying machine operator has punched the product perforations upon the records.

All such methods of obtaining products from perforated record data are time consuming and considerably detract from the use of such record controlled accounting machines when corelated multiplying operations are required which involve the perforated record data.

The present invention therefore has for one of its further objects the provision of a new machine which is adapted to permit the prepunching upon records of the two factors of a computation, for example, the multiplier and the multiplicand. Such punching may be effected by any well known punching machine now in use. After such factors have been punched in the records the records or record material so preperforated is placed in the machine, which forms the subject matter of the present application and run therethrough. The machine then automatically handles the records and reads the multiplicand and multiplier factor data pertaining to each computation, then effects multiplying of the factors into a product and finally records such product. Such recording in the present embodiment is effected by marking back upon the record from which the factors of the computation were derived markings representative of and designating the product.

Furthermore, in the present embodiment such markings are in the form of perforations so that the records are then adapted for use in accounting machines wherein it is desired to derive the product representing data from the records.

All of the operations of record handling, reading of factor data, entering of such factor data into the calculating or integrating section of the machine, effecting multiplication, making of a product record and if desired adding products and the clearing of the multiplying machine after the product computations, are effected automatically. The operator merely places the record material in the machine and starts it in operation after which no further attention is required.

Accordingly, further objects of the present invention reside in the provision of a novel form of record control accounting machines adapted to carry out operations not heretofore capable of being performed on such machines. Certain of such operations have heretofore been set forth and others will be more fully set forth in the accompanying specification.

A further object of the present invention resides in the provision of an improved form of multiplying commutator in which a relatively less number of sections are provided than heretofore have been necessary in previous machines of this class which I have devised.

While the machine has for one of its objects the provision of a multiplying machine capable of control by preperforated records and capable of marking such records, the invention in its broader aspects is not limited to such types of machines.

Further and other objects of the invention will be hereinafter set forth in the accompanying specification and claims and shown in the drawings which by way of illustration show one and a preferred embodiment of the invention.

In the drawings:

Figures 1 and 1a taken together show a top plan view of the machine;

Fig. 2 shows a face view of the upper part of the left hand end of the machine;

Fig. 3 is a cross-sectional detail view of the card reading and punching section of the machine, the section being taken on line 3—3 of Fig. 1;

Fig. 4 is a transverse detail sectional view taken substantially on lines 4—4 of Fig. 3;

Fig. 8 is a similar view of the multiplicand register and is taken on line 8—8 of Fig. 1a;

Fig. 9 is an elevational view taken substantially from the right hand of the machine as viewed in Fig. 1a and on line 9—9. Certain parts are shown in phantom in this view in dotted lines, the same being to the right of the section lines of Fig. 1a;

Fig. 10 is a detail perspective view of certain reading out mechanism shown in Fig. 9 and also in top plan in Fig. 1a;

Figure 16:
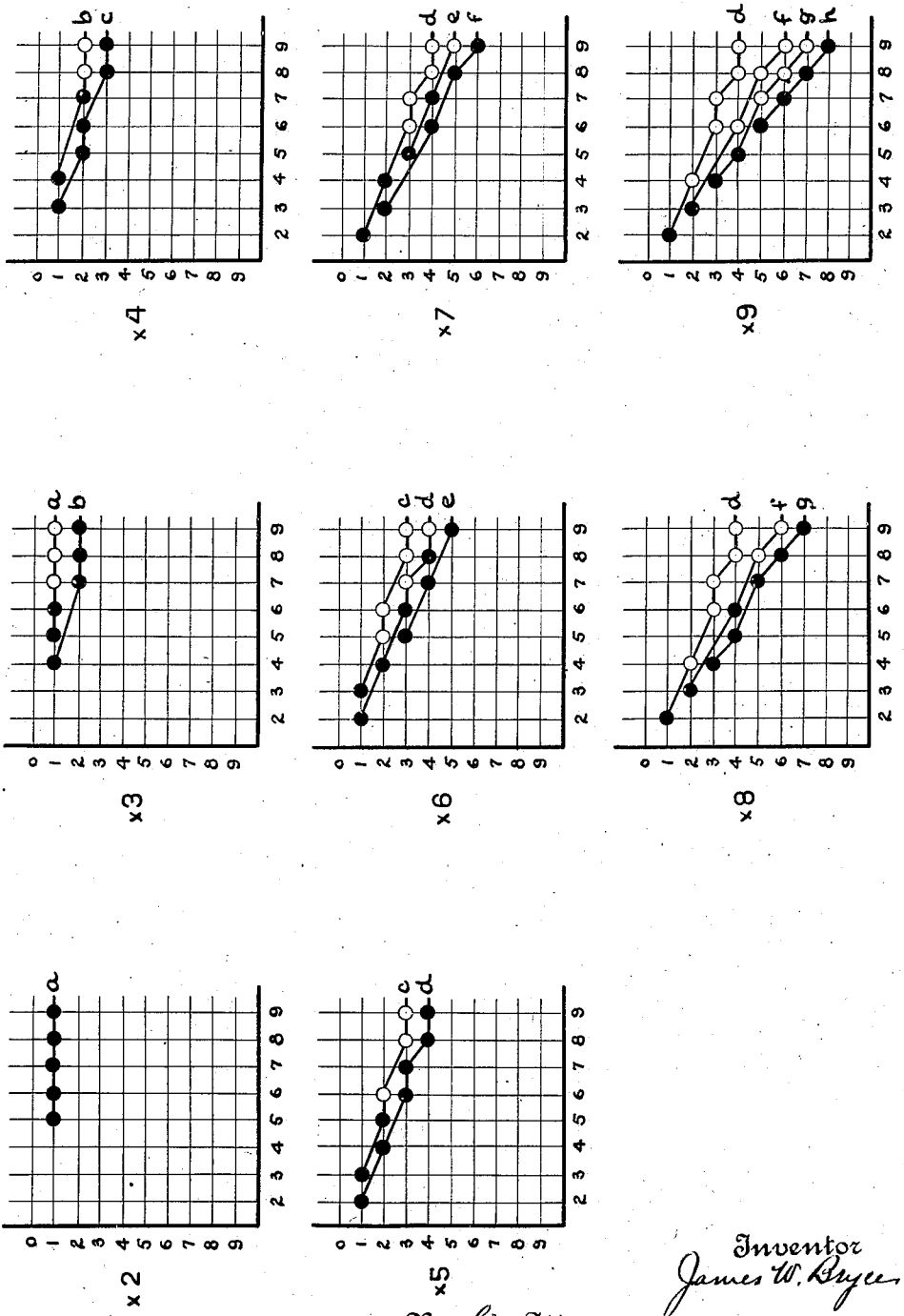
Figure 17:
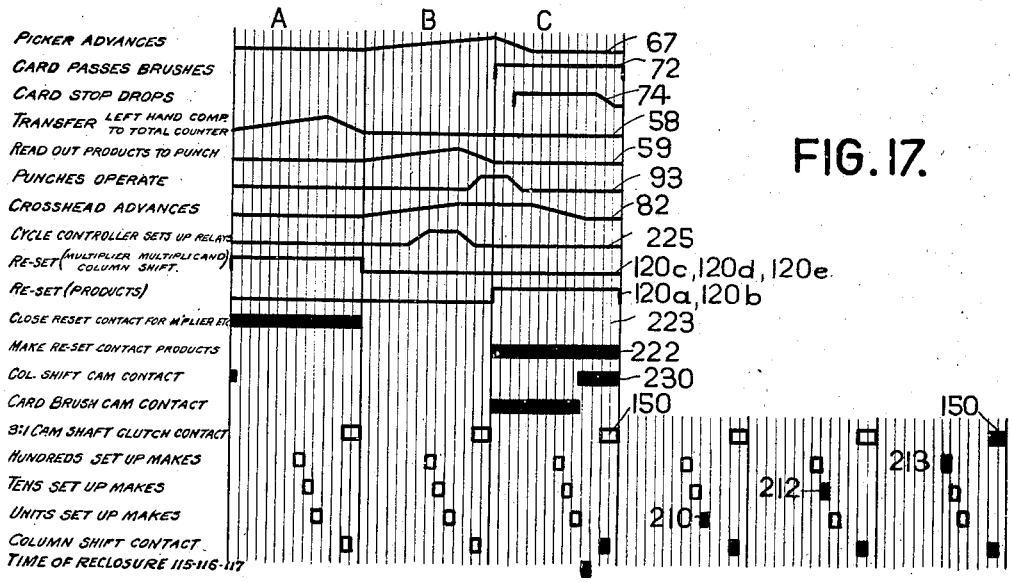
Figure 18:
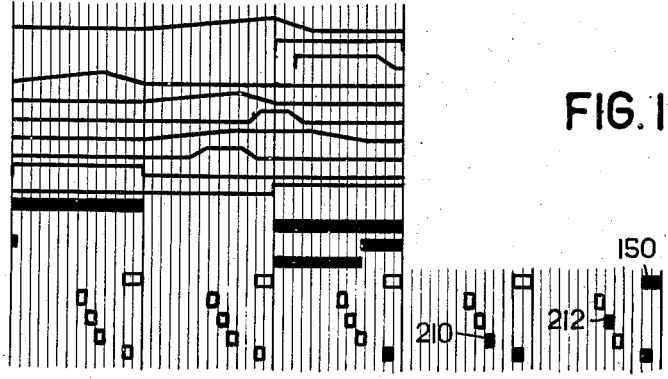
Figure 19:
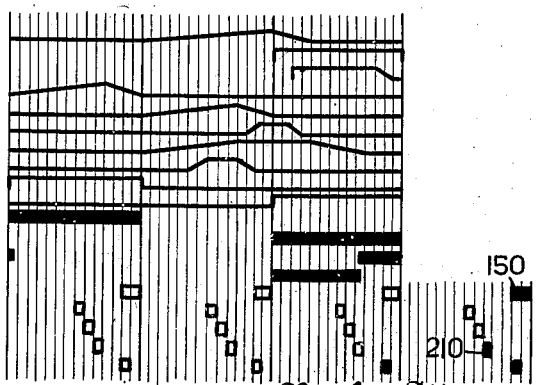

Figs. 14, 14a, 14b, 14c, and 14d taken together show an electromechanical diagram of the machine with various electrical circuits;

Fig. 15 is a diagrammatical illustration of the operations which the machine performs;

Fig. 16 represents a series of views showing the development of a part of the multiplying commutator;

Figs. 17, 18 and 19 represent timing diagrams of the machine;

Fig. 20 is a diagrammatic development view of a multiplying commutator of the type previously used by me and shows the manner of arriving at the configuration of the commutator shown in Fig. 14a.

Before describing the details of the machine a brief explanation will be first given of the general mode of operation of the machine.

After the cards have been punched up with the factor data by a punch card operator, a group of cards are placed in the card magazine of the machine. The operator starts the machine in operation and the first part of the operating cycle is concerned with clearing of the machine and setting it for the entry of the first problem to be computed. During the cycles which effect such initial clearing and resetting operations, the first card is withdrawn from the magazine and passed through the sensing station. In transit through this station the factor data is read from the card and entered into the multiplier and multiplicand receiving devices. Such receiving devices may be in the form of the usual well known registers used in tabulating machines, but they are provided with certain extra devices for enabling reading connection to be established from them to the computing mechanism. After the card has been thus read and the factor data derived therefrom it is advanced into a punching die and it is held in this position during that part of the operating cycle of the machine in which the computing and recording is being performed. At the time the card has entered the die, the machine has become set not only with the entry of the numbers or factors to be computed, but the machine has also determined from the card the size of the problem to be computed and it has automatically set itself to complete a number of computing or integrating cycles which are sufficient to carry out that particular computation.

In further explanation of this feature of the invention, it may be explained that if the machine is constructed to handle three significant figure computations and then if cards with a less number of significant figures were entered unless special provision was made for it, the machine would always go through an idle number of computing cycles representative of the largest capacity which the machine would be capable of handling. To dispense with these unnecessary cycles, a cycle controller is provided which according to one form controls the number of cycles from the left hand significant figure of the multiplier. Thus if the multiplier were 312 the machine would be controlled to require three computing cycles. If the multiplier was 12, only two computing cycles would be required and if the multiplier was the number 9 only one computing cycle would be required.

According to another alternative form of cycle controller, the number of computing cycles would be controlled by the significant figures only of the multiplier. In other words if a multiplier involved zeros such as for example, the number 303 the cycle controller would automatically eliminate an idle computing cycle for the zero and the result would be that only two computing cycles would be made by the machine.

After the multiplier and multiplicand are entered into the receiving devices of the machine, these receiving devices, according to their setting, operate conjointly with the multiplier commutator and emit partial products into receiving devices. In order to save time in the number of cycles of the machine operation, two receiving devices are provided in the form of accumulators and the right hand components of the various partial products are entered into one receiving device and the left hand component of these partial products are concurrently entered into other receiving devices. The receiving devices function automatically receiving the partial products and the number of accumulating cycles of these receiving devices is coordinated to the number of figures in the multiplier. For example, if 335 was the multiplier there would be three accumulating cycles of both receiving devices. If there was only one significant figure in the multiplier, regardless of its denominational position, the receiving devices would only require one accumulating cycle if the alternative form of cycle controller were used.

After the receiving devices have separately gathered together the accumulations of the left and right hand components of the partial products, reading out devices are called into operation, which reading out devices derive the accumulation of partial products from one accumulator and enter it into the other accumulator or receiving device. Thereafter another reading out device comes into operation and thereafter the whole product is read out of the second accumulator and this amount is recorded by the punching mechanism back upon the record card from which the factors of computation were derived. After such recording, the record card is released from the die and automatically passed to a stack.

*Main drive*

Figure 6:
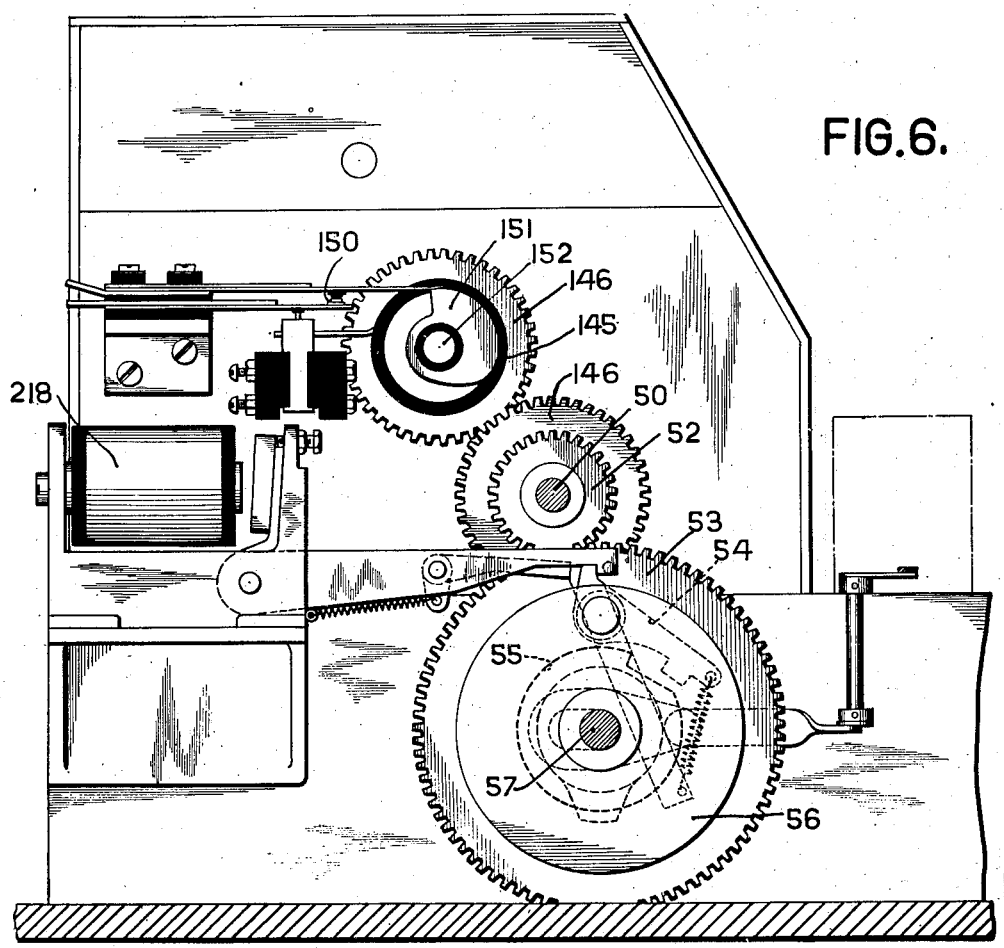
Fig. 6 is a detail elevational view showing the card feeding control mechanism. This section is taken on line 6—6 of Fig. 1.

The machine is adapted to be driven by a driving motor M (Fig. 9) which motor through a belt and pulley drives the main drive shaft 50 of the machine. The drive shaft constantly rotates while the machine is in operation. The reset shaft 51 (Figs. 1 and 1a, and 9) constantly rotates during the operation of the machine and is driven from the main drive shaft by suitable gearing. Drive shaft 50 extends through the various calculating sections of the machine and at its opposite end is provided with a gear 52 (Figs. 1 and 6) which drives a clutch gear 53. The driving ratio is 3 to 1 so that the clutch gear 53 makes one revolution for three revolutions of the main drive shaft 50. Cooperatively associated with the gear 53 is a one revolution clutch comprising clutch dog 54 and notched clutch disk or member 55. The notched disk 55 is fixed to rotate in unison with gear 53 and the clutch dog 54 is supported upon a disk 56 (Fig. 4) which is fastened to the primary drive shaft 57 of the card feed and punching section of the machine. Shaft 57 extends through disk 55 in gear 53 and extends to the right from the point shown in Fig. 4 to the opposite end of the machine adjacent the motor (see Figs. 1a and 9). Adjacent the right hand end of the machine, shaft 57 carries two cams 58 and 59 respectively, which cams respectively operate forked end bell crank members 60 and 61 (Fig. 10) which respectively operate reading out operating devices 62 and 63. The shaft 57 adjacent its right hand end also carries a number of cam contacts which will hereafter be described in connection with the circuit diagram.

*Card feed*

Figure 1:
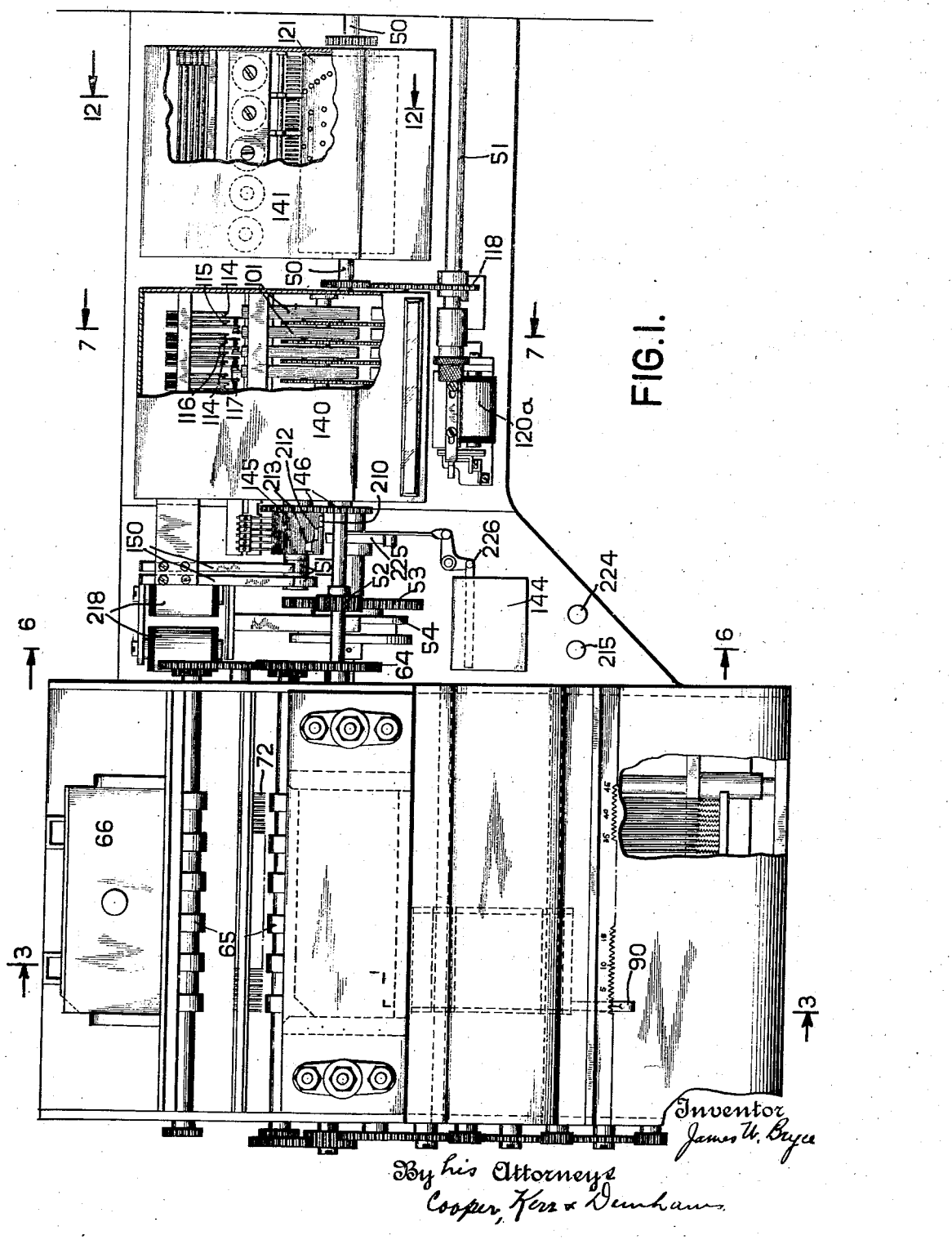

Referring now to Fig. 1, the main drive shaft 50 also is provided with a suitable gear 64 which through a gear train of the usual type drives the feed rolls 65 pertaining to the card feeding section of the machine. Such feed rolls 65 are also shown in Fig. 3. The gearing for driving the feed rolls in unison is shown in Fig. 2 and in Fig. 1.

Referring to Figs. 2 and 3, 66 is a card magazine of usual type. 67 is a picker which is actuated from a picker cam 68 on a shaft 69, which by gearing 70 is driven from the primary card feed shaft 57. By the rotation of shaft 57 a card is advanced from the magazine into the first of the feed rolls 65 thence it is carried by the feed rolls under the sensing brushes 72 and thereafter it is carried by the succeeding feed rolls, into the die plates 73. The card is arrested in proper alignment in the die plates by a stop 74 (Fig. 3) which stop is kept in elevated position against the tension of the spring 75 by a cam follower bell crank 76 which cooperates with a cam 77 upon the shaft 57. When the card is in the die, rolls 65a slip relatively thereto and delivery of the card is prevented by the stop 74. At the proper time in the cycle of the machine when this stop is lowered the card is ejected from the die and picked up by the succeeding feed rolls and delivered to the stack 78.

*Punching section of the machine*

During the period that the card is in the punching die it is punched. The punching device comprises a number of punches 80 arranged in rows, and for each row an interposer selector 81 is provided. The punch selectors 81 are advanced to selected position over the tops of the punches by an impositive drive mechanism which comprises a bar 82 having mounted thereon pawls 83, one for each column and for each selecting bar. 82 is moved to the left as viewed in Fig. 3 by a linkage 84 having a cam follower cooperating with the cam 86 disposed on shaft 57. The differential movement of the selectors 81 is determined by the stop pawls 87, which pawls cooperate with ratchet teeth upon the selector bars. Tripping of pawls 87 is effected through punch selector magnets 88. The punch selector magnets 88 and associated armature parts are mounted on a frame which is transversely slidable on rods 89. By sliding this assembly to the proper position the pawls 87 can be aligned with selected columns of punch selecting interposers 81. Prior to such sliding pawls 87 are retracted by a handle 90 which also acts as an index for the position of the punch selector magnets. Retraction of the pawls is effected by a bail 91 upon a member 92.

It will be understood that if a given selector bar or bars have their interposer ends over the particular punch or punches, that upon elevation of the punch die, such punches will be forced through the card. Reciprocation of the punching dies is effected by a punch cam 93 (Fig. 2) which cooperates with a follower 94. The upper of the rolls 65a is carried by part of the die and is raised during the punching action, again coming into cooperation with the lower rolls 65a by return of the die.

Card levers

Figure 5:
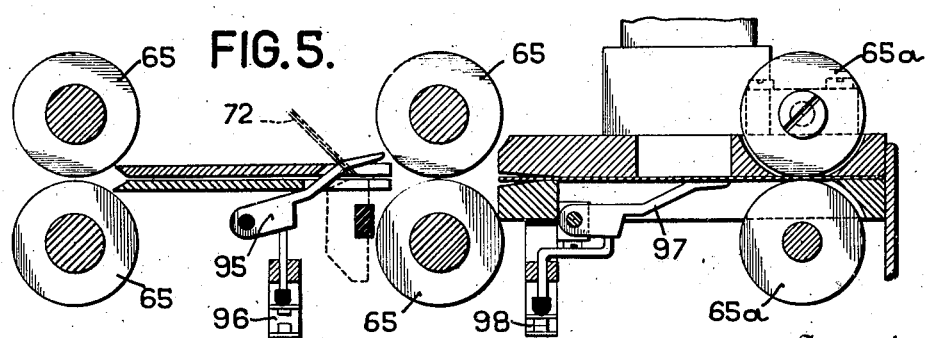
Fig. 5 is a fragmentary detail view of the card lever devices and the section is taken substantially on lines 5—5 of Fig. 4.

Referring now to Fig. 5, two card levers are provided in the machine. One card lever 95 is adapted to close card lever contacts 96 when the record card is underneath the sensing brushes 72. The other card lever 97 is adapted to close its contacts 98 when a card is in the punching die section of the machine and to open such contacts at other times.

Card reading and entry of factor data

The card sensing brushes 72 as will be hereinafter described in connection with the circuit diagram, establish electrical connection to the clutch magnets of the multiplier and multiplicand receiving devices. These receiving devices are substantially similar in construction, except for their top reading out sections and so far as the entering of numbers therein, these operate in a similar manner to the registers of the tabulator shown in Lake U. S. Patent No. 1,307,740. They are provided with the usual differential clutches and are driven in timed relation with the main drive shaft 50 in a conventional manner.

Figure 7:
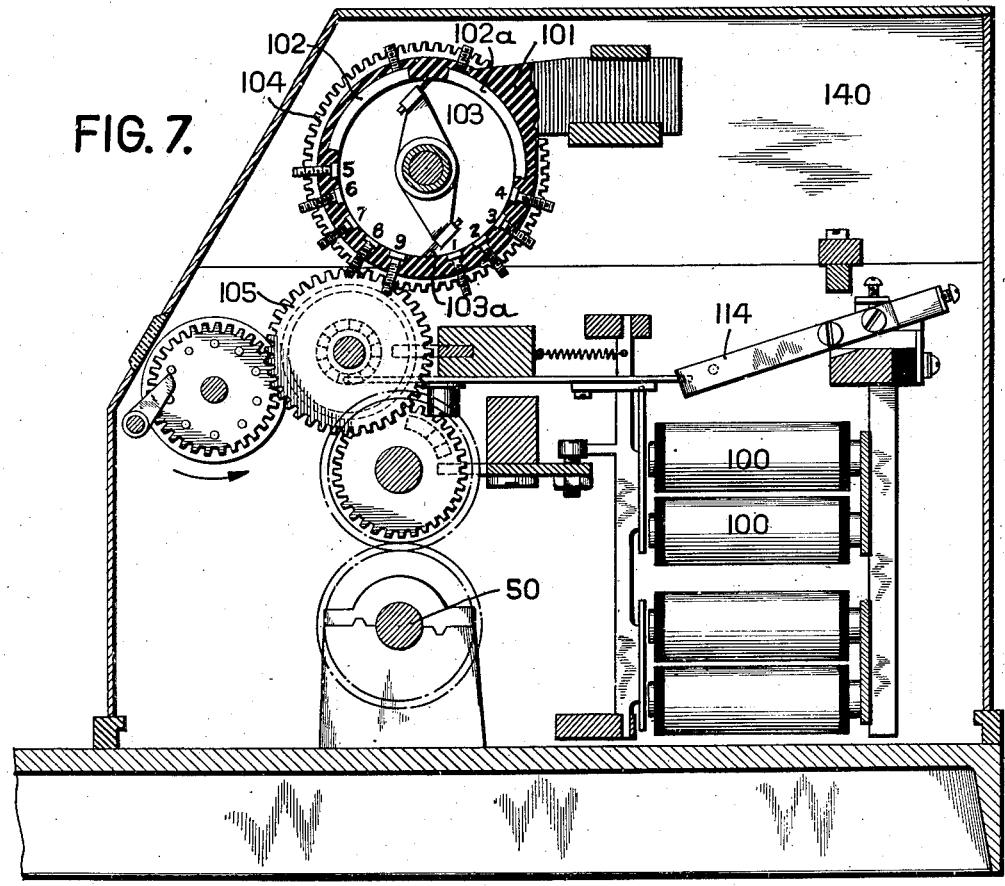
Fig. 7 is a detail sectional view of the multiplier register or receiving device and is taken substantially on line 7—7 of Fig. 1.

By the usual entering action the multiplier and multiplicand designations on the records are set up on the index wheels of the multiplier and multiplicand registers. In the multiplier register, geared to the index wheels (Fig. 7) is a commutator structure which will now be described.

The commutator comprises a stationary insulated ring 101 provided with contact spots numbered from 1 to 4 as shown and other spots numbered from 5 to 9, inclusive. The commutator is also provided with a long segment 102 which is opposite the spots from 1 to 4 and another segment 102a which is opposite the spots from 5 to 9. For each commutator segment a brush structure is provided comprising two brushes 103a and 103, electrically connected to each other and differentially positioned by a gear 104 which meshes with the corresponding clutch gear 105 of the register. The arrangement of the brush structure and spots is such that when brush 103a contacts with spots 1 to 4 inclusive, brush 103 will be in contact with long segment 102 and when brush 103 contacts with spots 5 to 9, inclusive, brush 103a will be in contact with long segment 102a. It will be understood that a similar brush arrangement will be provided for each denominational order in the multiplier register.

Figure 8:
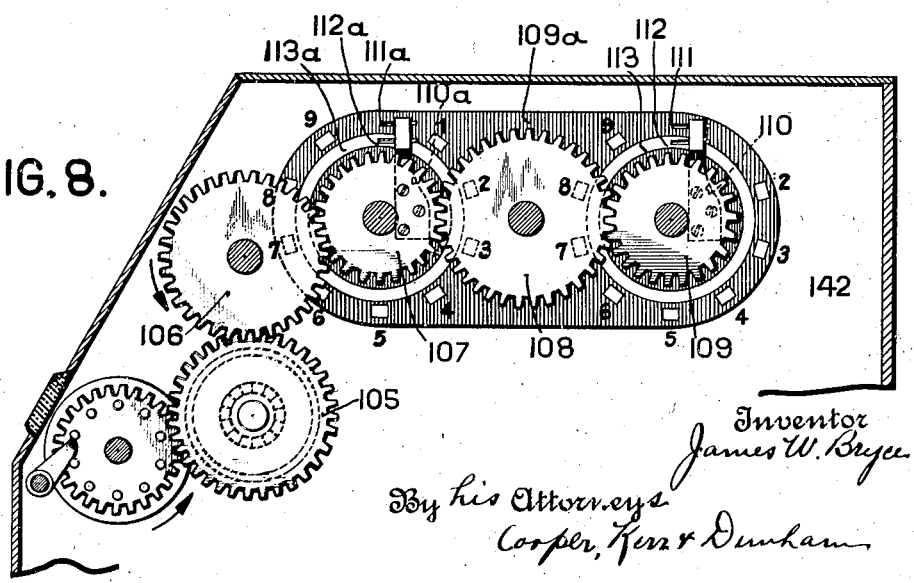

Referring now to the multiplicand register, Fig. 8, the clutch gears 105 of this register are adapted to drive brushes through gear trains 106, 107, 108 and 109. In this register a double commutator structure is provided comprising a stationary insulating support 109a provided with two circumferentially numbered sets of spots, those to the left being numbered from 1 to 9 inclusive and those to the right numbered from 2 to 9 inclusive. Cooperating with the left hand section of the commutator is a brush structure 110a, provided with a brush 111a to traverse the numbered spots and another brush in electrical connection with 111a designated 112a to traverse a common conducting segment 113a. The right hand section is substantially the same and the parts carry similar reference numerals, except that the suffix a is omitted.

Referring again to the multiplier register, this register has the usual counter magnet contacts 114 and cooperating with each of these contacts is a supplementary cycle controlling contact 115, and so forth (see Figs. 1 and 14). There is one of these supplementary contacts for each denominational order, 115 being for the units column, 116 for the tens, 117 for the hundreds and so on according to the capacity of the machine.

Figure 11:
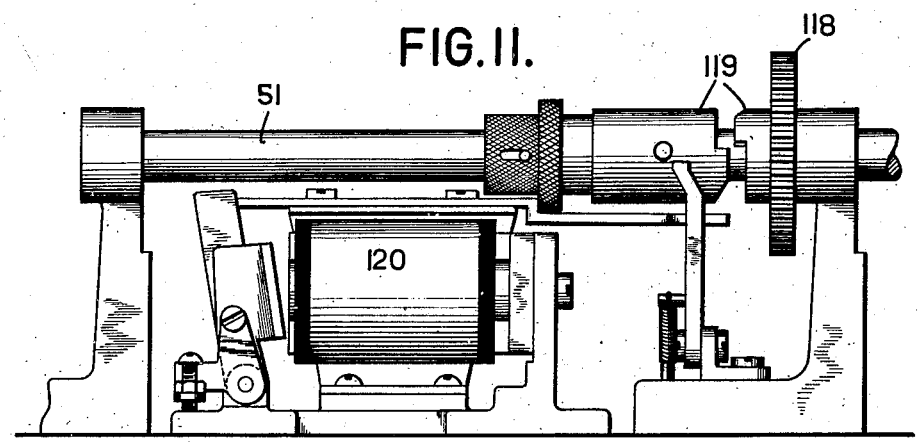
Fig. 11 is a front view of one of the reset clutches.

Each of the registers and accumulators and also the multiplicand commutator and the column selector mechanism is adapted for resetting from the constantly rotating reset shaft 51. Individual electromagnetic clutch mechanism is provided for this purpose as shown in Fig. 11. The reset gear 118 of each device which is to be reset is provided with a clutch of the one revolution type generally designated 119 and the members of this clutch are engaged by the energization of a reset magnet 120. There is one individual reset magnet 120 for each particular device which requires resetting and hereafter in the diagram these different reset magnets will be termed 120a, 120b, etc.

Multiplying commutator

Figure 12:
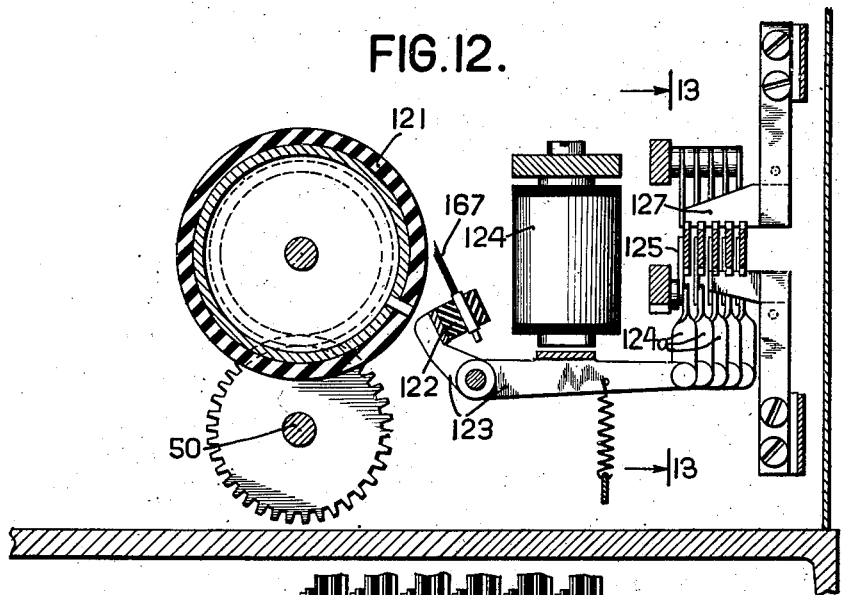
Fig. 12 is a detail sectional view of the multiplying commutator, the section being taken substantially on line 12—12 of Fig. 1.

The multiplying commutator which will be more fully described in connection with the circuit diagram comprises a cylindrical insulating member 121 (see Figs. 1 and 12) which is continuously rotated in anti-clockwise direction in timed relation with the main drive shaft 50 by the gearing shown in Fig. 12. The commutator has various contact spots which will be more fully described hereinafter and these spots are grouped in sections on the member 121. For the five sections which pertain to the right hand components, groups of brush devices are provided which can be selectively thrown into cooperation with the commutator by the mechanism which will now be described. Each group of brushes pertaining to a section is carried by an individual holder 122 adapted to be rocked by a lever 123 upon the energization of a magnet 124. It will be understood that there is one member 123 for each section on the multiplying commutator and each member 123 has connected to it a link 124a connecting to a bell crank 125. For each bell crank 125, a toothed selecting bar 126 is provided. These selecting bars have certain teeth thereon disposed as will be more fully explained in connection with the circuit diagram and such teeth are adapted to actuate transversely disposed wings 127 on the contacts. There are three members 127 below the bar assembly and six of such members above the bar assemblies. The lower contacts which are selectively actuated are designated 128a, 128b and 128c. The upper contacts are respectively designated 129c, 129d to 129h inclusive. By the energization of any section magnet 124 its group of brushes will be brought into cooperation with the multiplying commutator and a selection made of contacts 129c to 129h and of 128a to 128c as will be explained in connection with the diagram.

Referring to Fig. 1a there is also provided a column shift selector unit which comprises a commutator generally designated 130 and adapted to be driven by a differential clutch 131 which is magnetically tripped in a similar manner to a register wheel clutch. The commutator 130 not only has the function of column selection in the entry of the products or results into accumulator or result receiving devices, but it also is used in selecting the column of the multiplier device as will be subsequently explained. The column shift device is actuated from the main drive shaft 50 of the machine. As will be later explained the column shift commutator 130 is advanced one step of movement at the times of the cycle when required and after the computation is completed it is reset by the reset shaft.

*Accumulating sections*

The machine furthermore includes two accumulating sections or result receiving devices generally designated 132 and 133. These accumulating sections are in all respects similar to the accumulators shown in Lake Reissue No. 16,304, and each accumulator is provided with reading out devices 134 and 135 respectively of the type shown in that patent. The reading out devices 134 for accumulator 132 are operated by the mechanisms 62 as previously described and those designated 135 are operated by the mechanism 63 previously explained.

For convenience in subsequent description, the various units of the computing and integrating sections of the machine will be given general reference numerals with reference to the plan view of Figs. 1 and 1a. Starting from the left of the machine the multiplier receiving device or register unit will be generally designated 140. The multiplying commutator unit will be generally designated 141. The multiplicand receiving device or register will be generally designated 142. The column selector unit 143 and the accumulating devices for the left hand components of the products will be designated 132 and those for the right hand components 133. There is a further unit 144 which will be termed the "cycle selecting unit" or "cycle controller."

There is furthermore a commutator type of contact controller for successively controlling the multiplier denominational orders generally designated 145 (Fig. 1) which is driven from the main drive shaft of the machine continuously by gearing 146.

Referring now to Fig. 17, on the timing chart there are shown three succeeding cycles, A cycle, B cycle and C cycle. The time of machine operation of each of these cycles is equal and any one cycle represents one card cycle of the computing section or one complete revolution cycle of the main drive shaft 50. The A cycle plus the B cycle and C cycle represents one complete revolution of the shaft 57 which is the shaft for actuating the card handling section of the machine. The shaft 57 also has certain associated functions for computing or integrating but these functions occur during the time of revolution of such shaft.

In starting the machine from a condition of rest with the cards in the magazine only and not under the brushes, there are certain preliminary clearing or resetting cycles before the entry of the factor data from the card records. These preliminary operations may be better understood by first assuming that they have been completed and the machine is already in operation and that a card is presented to the brushes and about to be read thereby.

Referring to Fig. 17, this brings the machine to the beginning of the C cycle. At such time the card is beginning to pass underneath brushes 72 and such card has closed card lever contacts 96 and also during the card reading cycle, cam contacts 350 have closed. These contacts are operated by cams 351 on a shaft 57 (Figs. 1a and 14). The cam contacts 350 are closed from the 9 through the 1 index point positions and are opened between the 1 and 0 index point positions for a purpose to be subsequently described.

The reading of the multiplier and multiplicand is taken by the brushes from the cards and entered respectively into the multiplier register generally designated 140 (Figs. 1 and 14) and into the multiplicand register generally designated 142, in the manner of entry of amounts into registers as well known in the art. Selective entry into the registers may be effected by means of plug connections 154 (Fig. 14). The multiplier and multiplicand amounts are entered concurrently in the same cycle C into both registers 140 and 142.

Toward the last part of the C cycle, cam contacts 230 (Fig. 14) close at the time shown in the timing diagram (Fig. 17). Shortly thereafter brush 188 (Fig. 14a) makes contact with the spot 187 of the constantly rotating commutator 160. The time that this circuit is established by this brush contact is denoted by the black spot in cycle C of the timing diagram opposite the legend marked "Column shift contact" (see the next to the last line of Fig. 17). This circuit when completed energizes magnet 189 (Fig. 14a) and such magnet energizes and engages clutch 131 (Fig. 1a) and advances commutators 190 and 130 one step to the units order position. The complete circuit may be traced as follows: From the plus side of the line 170 (Fig. 14), through stop key contacts 215, card lever contact 98 now closed, cam contacts 230 (see also Fig. 17), wire 181, brush 180, ring 179, spot 187, brush 188, magnet 189, to ground 177. The foregoing operation conditions the machine for multiplying in the units order.

Inasmuch as the multiplier amount may be composed of one or more denominational orders and may have one or more significant figures therein, provision is made upon the reading in of the multiplier amount for determining the subsequent number of integrating cycles which the machine is required to perform in order to carry out the computation. For example, if there are three significant figures in the multiplier for instance, say the multiplier is 343, three integrating cycles will be required, one for each denominational order. On the other hand, if the multiplier was a two denominational amount such as 43, only two integrating cycles are required. Irrespective of the number entered the machine will make at least one integrating cycle. For the purpose of dispensing with unnecessary cycles in the event that small numbers are entered cycle controlling devices are provided. These cycle controlling devices comprise the previously mentioned supplemental contacts 115, 116, 117, etc. (see Figs. 1 and 14). These contacts open with the opening of other correlating counter magnet contacts 114.

If a multiplier amount is entered with a single significant figure in the units column or denomination, contacts 115 only will open, 116 and 117 remaining closed. If a number with two significant figures in the units and tens denominational orders is entered, 117 remains closed while 115 and 116 will open and if an amount is entered with three significant figures in the units, tens and hundreds orders, all of the contacts 115, 116 and 117 will open. The number of contacts will of course, be dependent upon the capacity of the machine which may be adapted for handling any number of denominational orders. The control from such cycle controlling contacts will be explained subsequently after a description is given of the computing or integrating operations.

The current through the brushes pass the plug connections and through the usual leads selectively energize the multiplier register clutch magnets 100, thereby setting up the multiplier register wheels and positioning the multiplier commutator brush devices. It will be assumed that 8493 is the multiplicand and 589 is the multiplier. The aforesaid entering action has placed the hundreds brush 103H on spot 5 and placed brush 103aH on long segment 102a. Similarly the tens brush 103T is on the eight spot and the 103aT is on the 102a segment. In the units order 103U is on the nine spot and 103aU is on the 102a segment. Hereafter when referring to units order devices the suffix U will be used, T will be used for tens, H for hundreds and M for thousands.

Referring now to 14b of the diagram, the entry of the amount into the multiplicand register 142 has set the brushes so that 111aM is on eight as is likewise 111M on its eighth spot, 111aH and 111H are on the four spots, 111aT and 111T are on the nine spots and 111aU and 111U are on the three spots.

*Multiplying commutator*

In previous machines which form the subject matter of previous applications filed by me, wherein impulse selecting multiplying commutators were employed, two sections of the commutator were allocated for each digit except for the digit 1 for which one section was provided. This required 17 sections in the multiplying commutator. Nine sections were used for emitting right hand components and eight sections for emitting left hand components.

In making products taking one digit times another, for example 4 times 9, the product is 36. In such multiplication, 6 is the right hand component of the result and 3 is the left hand component. Accordingly, the previous commutators for effecting multiplication required the number of right and left hand sections mentioned above.

With the commutator used in the present application, advantage is taken of a certain mathematical fact or principle to cut down the number of sections of the commutator. In place of using 17 sections as heretofore, six sections suffice.

The mathematical principle may be best illustrated as follows: If 7 is multiplied by 7 the result will be 49. Now if 7 is multiplied by the tens complement of 7 or 3, the result will be 21. Now if the respective products of the two computations are examined, it will be noted that the right hand components of the products are also in tens complementary relation to each other, i. e., 1 and 9 are in tens complementary relation to each other. Taking several other examples, if we multiply 9 by 8 the product is 72, then if 9 is multiplied by 2, 2 being the tens complement of 8, the result will be 18. Here again the 2 and the 8 the right hand component of the product will again be in tens complementary relation.

The above examples need not be further explained, but it will be found to apply to all the possible products.

The foregoing basic law is taken advantage of in the development of the commutator.

Referring now to Fig. 20, which shows the type of commutator heretofore used for emitting right hand components, it will be noted that if the right hand half of the commutator shown in this figure, is folded over on the left hand half so that the 9 section lies on top of the 1 section, the controlling spots will be found to coincide. The 9 section will be an exact counterpart of the 1 section. The 8 a counterpart of the 2 section, the 7 of the 3 section, the 6 of the 4 section and with respect to the 5 section, since its complement is itself, the sections will be identical.

The above fact enables one entire group of sections heretofore necessary in the previous commutator to be dispensed with, i. e. four sections of the previous commutator can be eliminated.

The present commutator generally designated 121 in Figs. 1 and 14a comprises a right hand assembly of sections specifically designated 160 and a left hand section specifically designated 161. The sections of the right hand assembly 160 comprise a 1 and 9 section, a 2 and 8 section, a 3 and 7 section, a 4 and 6 section and a 5 section.

By referring to Fig. 20, it will be noted that these sections are exactly the same as the left hand five sections of the commutator there shown. To utilize such diminished number of sections provision is made for electrically reversing the circuit relations to the spots which in effect is the same as folding over the commutator as previously mentioned.

Figure 14B:
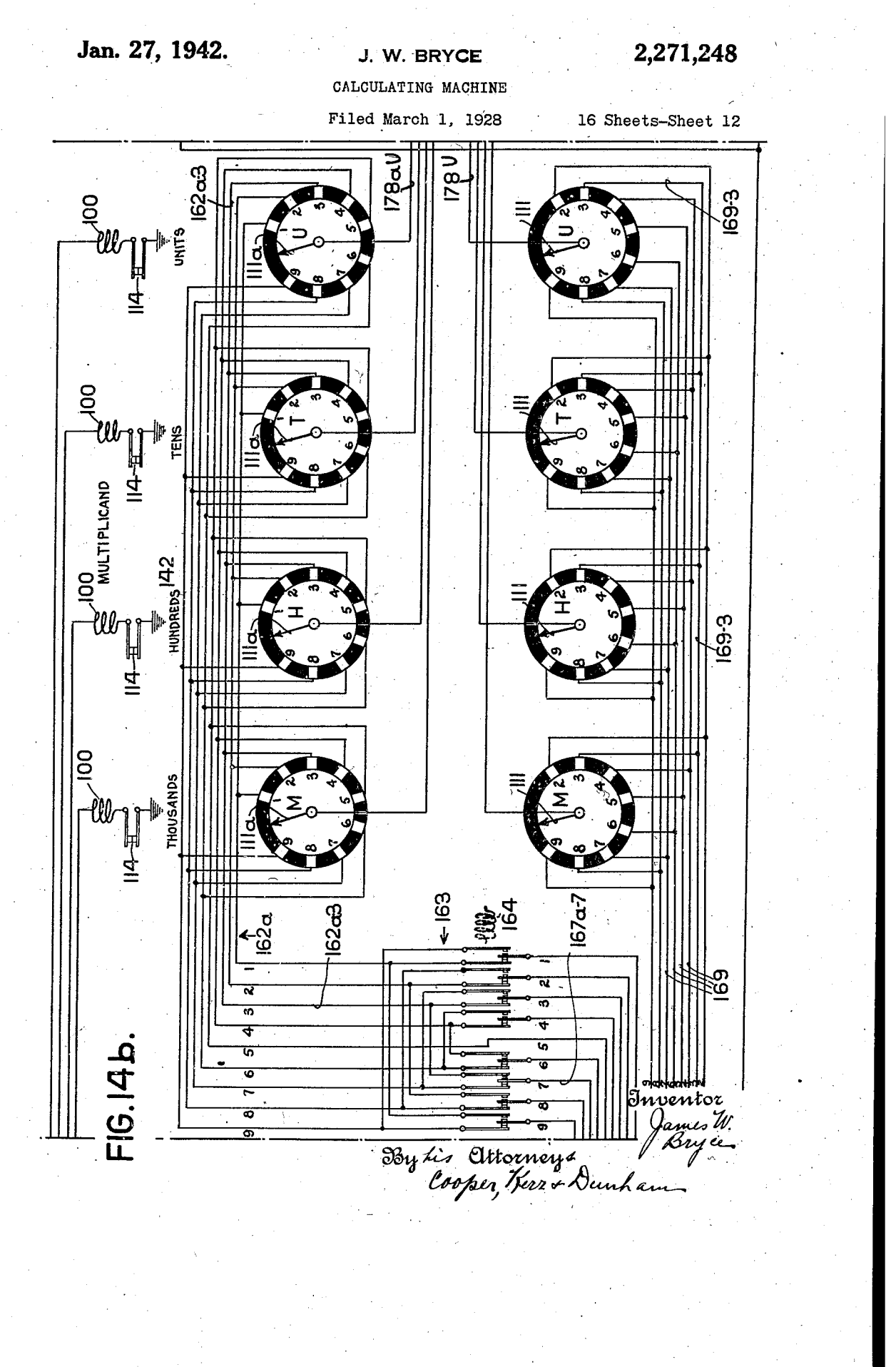

Referring to Figs. 14b and 14a, a series of leads generally designated 162a respectively, extend to and connect with the spots on the multiplicand commutator for right hand components of the products. The leads 162a are correspondingly numbered to correspond to the number of the spots. The leads 162a extend through a reversing switch 163 and if the contacts of this reversing switch are in the position shown, the circuits 162a extend directly through to the commutator 160 without any reversal. On the other hand if the magnet 164 is energized, the leads become reversed so that the 9 lead from the multiplicand device 142 now becomes connected to the one lead leading to the commutator 160. By selectively energizing the reversing switch the various sections on commutator 160 may be used for dual purposes. The control of this reversing switch 163 will now be described. Such control is obtained from the position of the brushes upon the multiplier commutator 140 (Fig. 14). When brush 103a (Fig. 14) is on long segment 102a, and brush 103 is on any of the spots numbered from 5 to 9 inclusive, the reversing switch relay 164 will be energized. Upon the other hand if brush 103 is on long segment 102, and brush 103a is on any of the spots numbered 1 to 4 inclusive, there will be no energization of relay coil 164. The relay coil 164 is shown in full lines in Fig. 14 and the circuit for this relay will be subsequently traced.

The foregoing has explained the manner of reversing the circuits to the right hand section 160 of the multiplying commutator. The commutator for the left hand components will now be described.

The commutator for the left hand components has only one main section in place of the plurality of sections provided in the right hand section 160. The commutator 161 is provided with a plurality of spots which are wired up in individual selective circuit groups as shown in Fig. 14a and as individually developed and explained in Fig. 16. In Fig. 16, the solid black spots are the effective ones for emitting timed impulses which form the left hand component. To the left of each detail figure of Fig. 16, is shown the digit constituting the multiplier. Taking the upper left hand detail figure of Fig. 16 marked ×2, 2×6 equals 12, and tracing up the vertical line from 6 it will be noted that the block spot is opposite the index point 1 (for the left hand component). Similarly with the figure just below it marked ×5, 5×6 equals 30 and tracing up from 6 at the bottom, the black spot will be opposite the third index point.

Figure 13:
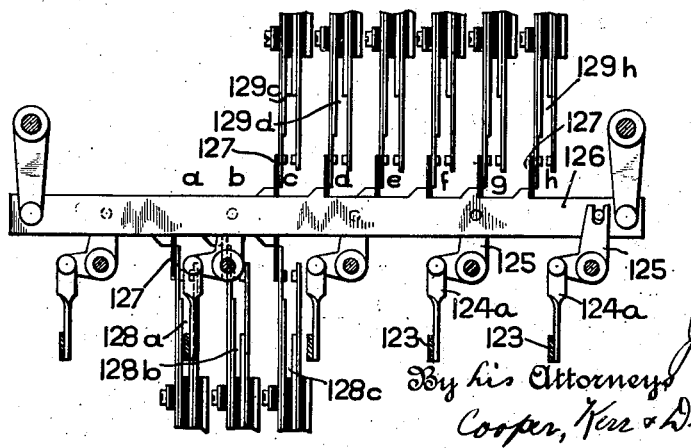
Fig. 13 is a detail view of the part shown in Fig. 12, the view being taken on line 13—13 of Fig. 12.

It will be understood that the various circuits shown on Fig. 16 are all incorporated on the commutator shown in Fig. 14a. In Fig. 14a these circuit groups lead to common conducting rings upon the commutator, which for convenience have been lettered from a to h inclusive. Cooperating with these common conducting segments are brushes similarly lettered. The brushes a to h inclusive are individually wired to the contacts 128a, 128b, 128c and 129d to 129h inclusive (see also Fig. 13). There is a double selection of the 128 and 129 groups of contacts. Provision is made for selectively controlling the current supply to contacts of the 128 group or to the 129 group and further provision is made for selecting which of the 128 or 129 group of contacts are to be effective. The primary selection is controlled by the switching relay 165 which is disposed in multiple with the relay coil 164 (see Fig. 14) and which coil 165 is adapted to actuate selecting contacts 166 (see Fig. 14a). If the multiplier digit is from 1 to 4 inclusive, the relay 165 will not be energized and the 128 group of contacts will be effective, contacts 166 being in the position shown. On the other hand if the multiplier lies from 5 to 9 inclusive, the 129 set are supplied with current, this being brought about by the energization of 165 and the corresponding change in position of contacts 166.

The secondary selection of current supply to contacts of the 128 group and the 129 group will now be described. Such selection of contact action is controlled by the device shown in Fig. 13 and also diagrammatically illustrated in Fig. 14a. The bars 126 have teeth on them disposed in combinations as shown in Fig. 14a and these teeth close the contacts in combination. For example, assume that magnet 124 of the 2 and 8 multiplier is energized, this will draw bar 126 to the right and will close contacts 128a in the lower group 128, and will close 129d, 129f and 129g in the upper group. It has been previously explained that if the multiplier amount was 2 all of the upper group of contacts 129 would be out of circuit, hence with the assumption just made the only effective contact would be 128a.

Referring now to Figs. 16 and 14a, because of the above control, ring a is alive and the only controlling spots which are effective are those shown in the ×2 illustration in Fig. 16. If on the other hand, the multiplier was 8, contacts 166 would be reversely actuated and the effective configuration of the commutator 161 would be as shown in the ×8 example in Fig. 16. The same type of selection is made for all of the sections 1 and 9, 2 and 8, 3 and 7, 4 and 6, and 5. It will be noted that a magnet 124 is provided for each section of the commutator 160 as previously explained and each magnet not only makes the selection of the configuration of the left hand commutator, but it also brings the brushes 167 pertaining to that particular section of the right hand commutator 160 into cooperation with that commutator. The left side of contacts 129c is connected by a wire to the left side of contacts 128c and a wire extends from this point to the c brush cooperating with commutator 161. The wire connection between 129c and 128c includes a one way current valve such as a copper oxide rectifier to permit current to flow down the wire when multiplying by six and to prevent reverse current flow.

Cooperating with and in constant contact with commutator 161 are a group of brushes generally designated 168 and individually numbered as shown. The brushes 168 are connected in leads generally designated 169 which extend to the left hand component commutator in the multiplicand device 142 as shown in Fig. 14b.

A particular numerical example will be taken and the action of the machine traced. Assume the multiplicand is 8493 and the multiplier is 589. The multiplicand 8493 is entered into the multiplicand device 142 and 589 is entered into the multiplier device 140. The circuit for effecting multiplying or integrating action of 9×3 which is the multiplication of the units digit of the multiplier, times the units digit of the multiplicand will be first traced. Brush 103U will now be in contact with the 9 spot and brush 103aU will be in contact with the 102a segment. Current will now flow from left hand side of line 170 through wire 171 through relay coils 164 and 165 through wire 172, through the order selecting device commutator spots 173 to be hereafter described, thence through wire 174 to segment 102a. Continuing the current flows through brush 103aU, 103U to the 9 spot, thence through one of the wires marked 175 and over to magnet 124 (Fig. 14a) pertaining to the 1 and 9 section, thence by wire 176 to ground 177 which is the other side of the line. The energization of magnet 124 pertaining to the 1 and 9 group has lifted brushes 167 pertaining to the 1 and 9 section into cooperation with the commutator. It has also moved its related selecting bar 126 to select and energize the proper spots on commutator 161. Relay coil 165 has been energized and reversing switch relay 164 has been energized. This action has set up the commutator 161 for a 9 multiplier and it now has the effective configuration of Fig. 16 with the ×9 illustration. Due to the action of reversing switch 163 the one and 9 section of 160 has been selectively coupled in the cycle to represent a 9 commutator. As previously explained, commutator sections 160 and 161 are in continuous rotation in timed coordination with the accumulators into which they enter the amounts.

Returning now to the multiplicand device 142, the brushes 111a and 111 pertaining to the digits order U are respectively upon the upper spot 3 and upon the lower spot 3. Brush 111a is thus connected to wire 162a—3. Brush 111U is connected to wire 169—3. Brushes 111a and 111 are electrically insulated from each other and are respectively connected to wires 178aU and 178U. Tracing back from 111a which is on spot 3, a circuit is established from this brush through the lead 162a—3, through the reversing switch to lead 162a—7, thence through brush 167—7 (Fig. 14a), through the spot numbered 7 on the commutator, through a common conducting segment 179, thence by brush 180 to wire 181, through cam contacts 230, cam lever contacts 98, stop key 215 back to plus side of line. Accordingly, when the commutator 160 reaches the 7 index point position in its rotation a differential timed impulse representing 7 will pass through the circuit thus traced and be emitted on line 178aU. Lead 178aU leads to an accumulating device and by this action 7 will be entered therein which represents the right hand component of the multiplication 9×3. Lead 178U, Fig. 14b, leads to an accumulator for the left hand components. Brush 111U is on the 3 spot and the circuit from 178U extends through this brush through the 3 spot to the line 169—3 and thence to the correspondingly numbered brush 168 (Fig. 14a). Upon the rotation of commutator 161, the aforesaid 3 brush 168 will encounter spot marked 2 which has been rendered alive. The current will flow through the f brushes, leads and contacts back to wire 182 and back to plus side of line. This will emit a differential timed impulse at the two index point position and impart such impulse upon the line 178U, Fig. 14b and accordingly, control the entry of 2 into the accumulator for the left hand components.

The circuit has been traced for the action in the units order of both the multiplier and the multiplicand. Concurrently with the same rotation cycle of commutators 160 and 161 other differential timed impulses are being emitted which serve to multiply all of the orders of the multiplicand by the digit 9 of the multiplier.

The resultant entry into the accumulating devices is that shown in Fig. 15, 2617 being entered into one accumulator for the right hand components and 7382 being entered into the accumulator for the left hand components.

The entry of 9×3 into the two accumulator devices will now be traced. The impulses coming over line 178aU (Fig. 14c) extends over to a brush cooperating with a common segment 183a on the selecting commutator generally designated 130. At this time in the cycle of the machine commutator 130 has been shifted one step in advance from the position shown so that a brush 184a is in contact with a spot 185a. The brush 184a connects to line 186a leading to the counter magnet pertaining to the units order of the accumulator 133 for the right hand components. After passing through the counter magnet the circuit goes back to ground 177 which is the other side of the line. Now for the entry of the left hand component. The impulse comes over line 178U, to segment 183, goes thence via spot 185, brush 184, line 186 to the counter magnet pertaining to the right hand order of the accumulator 132 for left hand components and back to ground. The entry into the other orders of both accumulators is effected by like spots and brushes. Sections of the column shift device 130 are allotted for each order which is to be entered. By the action thus traced the machine has entered the multiplication of the right hand significant figure of the multiplier times all of the figures of the multiplicand into the two accumulators 132 and 133.

Provision is now made for multiplying by the tens order of the multiplier. Commutator 160 is provided with a single spot 187, Fig. 14a, which again encounters the brush 188 and sends a current impulse to a magnet 189, clutches differential clutch 131, Fig. 1a and advances the commutator 130, Figs. 14 and 14c, one step in advancing direction. Commutator 130 also has a multiplier order selector section generally designated 190, having the spots 173 thereon pertaining to the units order, spots 191 pertaining to the tens order and 192 pertaining to the hundreds order and so on. The advancing movement of this commutator 130 and its section 190 has removed spots 173 from under their cooperating brushes and placed spots 191 in cooperation with its brushes. This action renders section U of the multiplier commutator dead and section T alive. Another entering cycle now ensues similar in all respects to the preceding cycle excepting that the multiplication is now that of 8 in the multiplier times all of the digits of the multiplicand. This action enters 4224 (Fig. 15) in the right hand accumulator 133 and 6372 in the left hand accumulator 132. The entries are made concurrently into both accumulators and the entry is furthermore entered offset one column to the left by reason of the action of the column shift commutator 130. For entering into the hundreds place another shift of commutator 130 occurs under the control of magnet 189 and in this cycle section T of the multiplier is dead and section H is rendered alive upon the action of the spot 187. This latter action enters 0055 into accumulator 133 and concurrently enters 4241 into accumulator 132 with suitable column selecting as before. The result of these various entering operations have entered a total of 50357 into the right hand accumulator and 495202 into the left hand accumulator.

Provision is now made for transferring the amount from the left hand accumulator into the right hand accumulator. Before describing such transfer it will be remembered that the number of integrating cycles will depend upon the size of the problem and the machine is provided with means for determining and controlling the number of cycles in accordance with the size of the problem. The entry of the amounts into the multiplier register 140 has selectively tripped all contacts 115, 116 and 117 as previously explained, according to the number of orders of the multiplier amounts. With the illustrated example all three of these contacts have been tripped open because the multiplier 589 has three significant digits. The opening of all of these three various contacts 115, 116, 117 has deenergized relay coils 193, 194 and 195 thereby closing contacts 196, 197 and 198 and opening contacts 199, 200 and 201. Contacts 196, 197 and 198 are wired in multiple across wires 202 and 203 and the closure of these contacts or any one of them permits current to flow from source 170 through wire 205 through the main motor switch 206 which is closed before beginning the operation of the machine, wire 207, wire 202, through one or more of the contacts previously mentioned, through wire 203, relay coil 204 and back to ground at 177. Energization of 204 has opened contacts 208 and held the same open. These contacts remain open during all computing and integrating cycles. Near the completion of the units integrating cycle a circuit is established from source through wire 202, wire 209, through commutator contacts 210, wire 211, through coil 193, through contacts 115, 116 and 117, which are reclosed at this time in the cycle of the machine and to ground 177. This energizes coil 193 attracting its armature and closing contacts 199. This establishes a stick circuit from wire 202, through coil 193, contacts 115, 116, 117 and holds the contacts 199 closed. On the next computing cycle of the machine a circuit is established from wire 202, contacts 199, now closed, commutator 212, wire 213a, relay coil 194, contacts 116 and contact 117 to ground 177. This causes relay 194 to be energized and attract its armature closing contact 200, thus establishing a stick circuit and contact 200 remains closed.

Upon the next computing cycle, current flows from wire 202 through contacts 200 now closed, commutator 213, wire 214, copper oxide rectifier affording a one way current valve, relay coil 195, contact 117 and back to source at ground 177. This energizes coil 195, attracting its armature and closing contacts 201 and establishing a stick circuit through contacts 201, relay coil 195, contacts 117 to ground. This action has opened all of contacts 196, 197 and 198 which were in multiple in lines 202 and 203 and has deenergized relay 204 permitting contacts 208 to close.

Assuming that the machine is operating on its first computing cycle, which for example is the units cycle, toward the end of the integrating portion of this cycle, rotation of the commutator 210 will permit current flow. On the assumption that the machine is operating on its tens computing cycle, toward the end of the integrating portion of this cycle, commutator 212 establishes contact and permits current flow. On a third computing cycle, toward the end of the integrating portion of this computing cycle, the commutator 213 closes its contacts and permits current flow.

By the above described control device a selective number of computing or integrating cycles are afforded in accordance with the position of the left hand significant figure in the multiplier. For example, with a three denominational order multiplier the fact that there is a significant figure in the left hand or hundreds place or column in the multiplier initiates and automatically brings about three computing cycles. On the other hand, if the multiplier was a two denominational amount it would have its first significant figure in the tens place. Two computing cycles only would be automatically initiated and brought about. Similarly if a single digit multiplier was used with the significant figure in the units place only one computing cycle would be required. With the arrangement shown and described the number of computing cycles will be directly detected by the denominational position of the left hand significant figure of the multiplier and the machine operation will be automatically adjusted accordingly. With the control just described, the left hand significant figure in the multiplier is controlling irrespective of whether there are any significant figures to the right of it or not.

It will be appreciated, however, that certain kinds of computations involve zeros in the multiplier, for example, the multiplier might be 200. In such cases with the cycle controller just described, three computing cycles would be necessary irrespective of the fact that during certain of these cycles (i. e. the first two) no quantities are actually being computed. Subsequently, in this specification a modified controller construction will be described which will control the number of cycles according to the number and place of the significant figures and where zeros occur, computing cycles will be dispensed with.

At this time in the cycle of the machine, a card is in the punching die section. Accordingly, card contacts 98 are closed and current now flows from source 170 through the stop key contacts 215 now closed, through contacts 98 now closed, wire 216, contacts 208 now closed, wire 217, through a clutch magnet 218 (see Fig. 6). The energization of clutch magnet 218 is further controlled by contacts 150 at the proper time and which close at the end of each computing cycle so as to definitely time the engagement of the clutch pawl 54 with the notched disk 55. Contacts 150 are operated from cams 151 upon a shaft 152 (see Fig. 6) which cams are driven in a one to one relation with the main shaft 50 through gears 146. The shaft 152 furthermore carries the commutator 145 (see Fig. 1) which upon the circuit diagram Fig. 14, is shown developed with three sections respectively designated 213, 212 and 210. A revolution cycle is now initiated of shaft 57. This revolution of shaft 57 is shown on the timing diagram of Fig. 17 and represents the A cycle plus the B cycle plus the C cycle. The energization of the clutch magnet initiates a number of card handling cycles. The main clutch magnet 218 when energized couples the driving motor of the machine to shaft 57 and causes reading out cam 58 (Fig. 10) to rock bell crank 60 and the associated reading out devices 62 and 134 pertaining to the left hand component accumulator 132. The result is that the reading out devices 134 (which are the type shown in the Lake reissue patent before mentioned) are actuated and the reading of the amount standing on the left hand accumulator establishes timed circuits through wires 219 to the counter magnets of the right hand accumulators 133 which accumulator then receives the transferred amounts. The finished and complete product is now in the right hand accumulator 133. Further revolution of shaft 57 causes cam 59 (Fig. 10) to actuate bell crank 61 and the reading out devices 135 pertaining to the right hand accumulator and these reading out devices derive a reading from the right hand accumulator and over lines 220 (Figs. 14c and 14d) selectively energize the punch selecting magnets 88, (see also Fig. 3). The energization of these magnets 88 differentially arrest the punch selectors 81 and selects which punches are to punch the product in the record card. The punching action now ensues as previously explained.

In the event that it is desired not to punch all of the orders in the product for example, in the event that the product contains insignificant decimals, provision is made for interrupting the punch selector circuits by switches 221 shown in Fig. 14d.

The above explanation has completed the tracing of the multiplying operation and the punching back of the product on the card. Resetting of various parts is required and in order to save cycle time certain resetting operations are being effected during the time that multiplying and punching operations are being performed. At the step in the cycle when the left hand components are being transferred to the right hand component register, i. e. in the A cycle (Fig. 17) reset of the multiplicand and multiplier receiving devices is effected. This resetting action is initiated by cam contacts 222 which are disposed on shaft 57. Closures of these contacts establishes a circuit from source through the reset clutch magnets 120a and 120b pertaining to the multiplier and multiplicand registers and back to source on ground 177. After the amount has been taken from register 133 and read into the punch selectors reset of register 133 and register 132 and of the column shift commutator 130 is initiated by cam contacts 223 which are upon shaft 57 and which cam contacts energize the resetting magnets 120c, 120d, and 120e pertaining to the column shift device, the left hand accumulator and the right hand accumulator. During this cycle of the machine when the registers 132, 133 are being reset a new card is being passed under the brushes and entered into the multiplicand and multiplier registers as will be seen from the timing diagram Fig. 17.

Referring to the timing chart the previous description started with the assumption that a card started to pass under the reading in brushes. On the timing chart this is shown by the card feed cycle C. This was done for convenience of explanation, but in practice it will be understood that the machine would ordinarily start with no cards under the brushes. Cards would only be in the card magazine. Assuming that such is the case and that there are no cards in the machine under the brushes and that the cards are only in the magazine, the starting operation would be as follows:

Main motor switch 206 (Fig. 14) would first be closed starting the motor M in operation. This would start driving the main drive shaft 50 of the machine. The operator now presses start key 224 which closes the circuit to the main clutch magnet 218. The machine operation then proceeds and there is an attempt to derive products from the left hand register 132 and to transfer them into the right hand register notwithstanding there are no amounts standing thereon. This is in the cycle designated A on the timing chart (Fig. 17). The operation continues and there ensues the cycle of reading out from 133 into the punch section and the attempted punching of the card which does not, however, take place as no card is present. During the A cycle the multiplicand and multiplier registers are cleared to prepare them to receive amounts during the C cycle. During the B cycle the picker operates to advance a card to the brushes from the card magazine. During the C cycle the new card which is now the first card from the magazine and which has been advanced by the picker passes under the brushes and the multiplier and multiplicand amounts are read into their corresponding registers. The subsequent operation is the same as previously traced. Furthermore, if the machine has been started with no cards under the brushes provision must be made for setting the cycle controller into active position. This is effected by means of a cam 225 (Fig. 14 and Fig. 1) which actuates the common bail 226 to set up the various relays with contacts 199, 200 and 201 closed. The cycle controller then operates in the manner previously described.

Cam contacts 230 which are disposed upon shaft 57 are provided in order to permit the circuits from the computing mechanism to the accumulators which receive the products to be alive or operative only during the computing cycles of the machine. At the time when such contacts 230 are open current can only flow to the accumulator, (i. e. the right hand accumulator) from the reading out devices pertaining to the left hand accumulator.

The previously described controller shown in Fig. 14 was adapted to control the number of computing cycles in accordance with the denominational position of the left hand significant figure of the multiplier.

Referring to the circuit diagram Fig. 14d, in some cases, it may be desirable not to reset the product register 133. For example, it might be desired to have this product register run up a series of accumulative totals of previous computations. This result may be effected by opening a switch 260 (Fig. 14d) disposed in the circuit of the reset clutch magnet 120e pertaining to the product register. It will be appreciated that if the machine is now operated each card as it is computed, will be perforated with an amount which is the product of the factor on that card plus the products derived from the previous computations. In the event that it is not desired to so perforate each card, the switches 221 can all be opened, which can suppress entirely the punching of products, then a final card which can either be the last card of the group or a special blank card, can receive the product by closing such switches 221 before such card passes into the die.

The above construction enables grand totals and special totals of products to be obtained by the machine.

In other cases, it may be desirable to allow either the multiplicand factors to accumulate or the multiplier factors to accumulate. To allow the accumulation of multiplicand factors switch 262 can be opened and multipliers can be accumulated by opening switch 261. With one of these switches open and the other closed, the computations effected would be that of one factor which could vary for each card times the accumulative sum of the other factors previously introduced. If desired, the one factor which is entered and which has its reset switch open can be entered from a separate card and in this case if all the succeeding cards have that particular card field blank there would be a multiplication of a constant quantity by the other factor which might vary from card to card. The switches 221 can also be manipulated in connection with the manipulation of switches 261 and 262 according to the result which it is desired to obtain.

In the event that it was desired to maintain one of the factors constant without having blank fields on the succeeding cards after the first, it will be understood that the plug connections 154 of desired and selected columns could be opened after the passage of the first card.

The machine is also capable of further expansion. Additional accumulator sections can be provided, for example, a separate totalizer like 133 may be connected in multiple with it to receive grand totals. Such an extra accumulator would permit the punching of each card with its own product and yet there would be obtained in the machine a grand total of the various computations. Obviously this is a mere expansion of the machine and no particular diagrammatical illustration of it is required, as it is the common practice in tabulating machines.

What I claim is:

1. A calculating machine including record handling devices, means for deriving from a prepunched record multiplier and multiplicand data which comprise both the factors of a to be performed computation, means controlled by the aforementioned means for effecting multiplication of the aforesaid factors and for representing a product, and means controlled by the product representing means of the multiplying means for punching back upon the record which contained the prepunched factor data punchings representative of the product of the factors.

2. A record controlled and record perforating calculating machine including in combination multiplying devices including product receiving means, means for controlling said devices for the initial entry of both factors thereinto from a prepunched record and punching means controlled by the product receiving means of the multiplying means for punching product perforations upon the record.

3. A calculating machine including multiplying devices with product receiving means controlled thereby, record reading devices, record perforating devices, means for automatically presenting a succession of records to the reading devices and to the punching devices, means for automatically entering all of the factors of the computation as derived by the reading devices and means for effecting multiplication of such factors after such entry, means for controlling the perforating devices by product receiving means of the multiplying devices to punch upon each record as it is presented to the punching devices a product record of the factors upon such record.

4. A calculating machine with multiplying devices including elements upon which a product is represented, means for controlling the same wholly from identifying marks upon a record, and means controlled by the elements upon which the product is represented for placing the result of the computation made by the multiplying devices in the form of identifying marks upon the record.

5. The invention set forth in claim 4 in which means is provided for successively automatically initiating and effecting the calculation of a plurality of independent successive calculations.

6. A calculating machine with multiplying devices and means for controlling the same by a succession of records having identifying marks thereon representative of factors of individual problems, means for automatically effecting by the aforesaid multiplying devices the multiplying operation of one set of coordinated factors entered from a record, and means for thereafter automatically and wholly by the operation of the machine itself initiating a succeeding multiplying operation pertaining to another set of factors by the aforesaid multiplying devices.

7. A calculating machine to automatically effect a succession of independent multiplying computations including multiplicand and multiplier receiving devices, multiplying devices, means for reading out the product which is formed by the multiplying devices, and means for resetting the multiplicand and multiplier receiving devices during the time of the cycle when the product is being read.

8. A calculating machine with means for entering therein under record card control a plurality of separate factors each being in multi-denominational form, means for sensing the position of the left hand significant figures of one of the factors, and means controlled by said last mentioned means for selectively determining the number of computing cycles of the machine.

9. A calculating machine comprising in combination, record controlled factor entry means for both factors of a to be performed multiplying computation, means controlled thereby for multiplying both the factors and for representing the products so obtained, and product recording means controlled by the product representing means of said last named means.

10. A calculating machine with multiplying means with product representing means, means for controlling operation of said multiplying means entirely by factor designations upon a record, and means controlled by the product representing means of the multiplying means for marking back upon the record a designation of the product.

11. A record controlled accounting machine with means for automatically passing through the machine a series of records each containing all of the factor data of a to be performed computation, and means for automatically effecting a multiplying computation of the data from each record and under its control as it is passed through the machine.

12. A calculating machine including in combination, with a main operating means, record handling means operated thereby for passing records through the machine, record analyzing means with provisions for reading a plurality of digit representations upon each record, each digit being represented by a single perforation in the record and all of the digit representations representing the multiplier and multiplicand data which comprise the factors of a to be performed computation, and entry means controlled by the record analyzing means and operated by the operating means, means controlled by the entry means and operated by the operating means for effecting multiplication of the aforesaid factors during the operation of the machine.

13. In a multiplying machine with multiplying devices, operating devices, automatic factor entry means for automatically entering into the multiplying devices factors representative of a series of computations to be performed by the machine, means for automatically initiating and effecting a multiplying operation by the multiplying devices after the factors of each problem are entered, and means for causing the operating devices to place the factor entry and multiplying devices in condition to perform a new and following separate computation after the requisite steps of the preceding computation have been completed and means for thereafter initiating another multiplying computation all by the automatic operation of the machine.

14. A calculating machine including in combination, record sensing means for concurrently sensing both factors of a to be performed computation from a record, factor receiving means controlled by the said sensing means to receive the factors, a record handling means for automatically presenting each of a series of records to the sensing means so that each record may be sensed thereby and then passed through and out of the machine, multiplying means controlled by the factor entry means for multiplying the factors together and for setting up a representation of the product thereof, and means for coordinating the operation of the record handling means and the factor entry means and the multiplying means so that the record may be sensed and its factors entered and thereafter multiplied, followed by an automatic repetition of such operations with a succeeding record.

15. In a partial products multiplying machine of the record controlled type, means for entering and setting up one factor of a to be performed computation, means for entering and setting up another factor of the to be performed computation, partial products computing means controlled by the foregoing means, means controlled by the foregoing means for the other factor and effective upon the factor being entered and set up for controlling the machine and the partial products computing means in its partial product computing operations to suppress a computing machine cycle wherever a zero is present in the highest order or orders of said other entered factor.

16. The invention set forth in claim 15 in which the means under control of the factor entry set up means also provides means for determining the required number of partial product entry cycles and for detecting their completion and including means effective upon such detection for re-initiating a new and separate computation.

17. A power operated partial products type of multiplying machine having a cycle controller therefor which includes means to measure the size and character of a factor entered into the machine, means controlled thereby for causing the machine to compute under the control of the significant figures both as to number and as to denominational place and to wholly omit unnecessary cycles represented by zeros in the highest denominational order or orders, said cycle controller also including means for re-initiating a new and separate computation.

18. A cycle controller for a power operated partial products type of multiplying machine including devices for evaluating one of two entered factors for the number of significant digits in such entered factor and the denominational places of such digits, said devices including means for controlling the computation in accordance with such evaluation, and means for re-initiating a new and separate computation upon the completion of the first computation.

19. A record controlled and record making accounting machine with record sensing means for concurrently sensing two factors of a to be performed computation from each record card handled by the machine, factor entry means for the aforesaid factors, multiplying means controlled by the aforesaid factor entry means for multiplying the factors together and setting up upon a product representing means the product thereof, a record punching means receiving each record after the factors have been sensed therefrom and means for controlling the said record punching means from the products representing means of a multiplying means to cause the punching means to punch the product upon the record which is perforated with the factors which relate to such products.

20. A record controlled accounting machine with a record sensing means for sensing the factors of a to be performed computation from such record, a record punching means, a record handling means for passing a succession of records through the machine and presenting each record first to the sensing means and then passing each record to the punching means, factor entry means controlled by the aforesaid sensing means for both factors of a computation, multiplying means controlled by the aforesaid factor entry means for multiplying the entered factors together and setting up the result upon a product representing means and means for controlling the punching means by the product representing means to punch upon each record the product of the factors appearing thereupon.

21. In a computing system, means engageable with a perforated record sheet for exploring the perforated record sheet for information, means for effecting a multiplying computation in accordance with the information detected by the exploring means, product accumulating means controlled by said last named means, means controlled by the product accumulating means for perforating the result of the computation on the record sheet, and means for automatically advancing the sheet successively to the exploring means and the perforating means.

22. In a computing apparatus, an accumulator, electrical actuating means for said accumulator, contact making means having multiplication table characteristics for controlling said actuating means, and card controlled means for controlling the actuation of said contact making means.

23. In an electrical computing apparatus, an accumulator for accumulating the result of a computation, multiplying means for actuating said accumulator, contact making means for controlling said multiplying means, card controlled means for setting up said contact making means, and means controlled by said accumulator for recording the result of a computation.

24. In an electrical computing apparatus, an accumulator for accumulating the result of a computation, multiplying means for controlling actuation of said accumulator, contact making means for controlling said multiplying means, card controlled means for setting up said contact making means in accordance with factor data derived from a controlling card, and means controlled by said accumulator for recording the result of the computation on the controlling card.

25. In a computing system, means for exploring a perforated record sheet for information, means for effecting a mathematical multiplication in accordance with the information found by the exploring means, means for perforating the result of the computation on the record sheet, means for automatically advancing the sheet successively to the exploring means and the perforating means, and means for rendering the last mentioned means effective at the completion of a computation.

26. In an electrical computing apparatus, record sheet feeding means, means for taking information from a record sheet, means connected therewith for effecting a multiplication in accordance with the information taken from the sheet, means for registering the result of the multiplication, means for resetting the registering means to zero, means controlled by the registering means for recording the result of the computation on a record sheet, and means operative at the completion of a multiplication for initiating operation of the sheet feeding means for advancing record sheets through the apparatus for causing operation of the recording means and for causing operation of the register resetting means.

27. In a computing system, means responsive in accordance with information on a record member, means for effecting a mathematical multiplication as determined by the operation of said means, means for recording the result of the computation on a record member, a magazine for receiving a supply of record members, and means for advancing record members one at a time from the supply to the record member responsive means and from the record member responsive means to the recording means.

28. A computing apparatus comprising means for receiving a plurality of statistical system cards, means for exploring a card for information, multiplying means for effecting computations in accordance with information transmitted thereto, means including factor receiving means for transmitting information from the exploring means to the multiplying means, means for recording the result of the computation on the card, means controlled by the multiplying means for registering the result of the multiplication and for governing the operation of the recording means, and means for advancing the cards one at a time from the receiving means first to the exploring means and then to the recording means.

29. In a computing machine, an accumulator, means for actuating the accumulator, multiplying means comprising a plurality of electrical contact members representing multiplication tables for controlling the actuating means, card sensing means, card controlled set up means for storing the factors of a problem and for controlling the operation of the contact members, and means controlled by the accumulator for recording the result of a multiplication on the card from which the factor data was sensed.

30. In an electrical computing system, an accumulator, means for actuating the accumulator including a multiplying device having a plurality of contact elements representing multiplication tables, card controlled devices including sensing means and means for setting up a multiplicand and multiplier to establish circuits through the multiplying device, means for resetting said setting up means to normal upon completion of a multiplication while retaining the product in the accumulator, and means controlled by the accumulator for recording the product on the card from which the multiplicand and multiplier were derived.

31. In an electrical computing system, card controlled means for setting up a multiplicand and a multiplier, a plurality of electrical contacting means having multiplication table characteristics controlled by the setting up means, accumulating means controlled by said plurality of electrical contacting means, means for actuating the electrical contacting means to acumulate the product in the accumulating means, and means controlled by the accumulating means for recording the product on the card from which the multiplicand and multiplier were derived.

32. A calculating machine including in combination a power actuated operating means, means controlled and automatically brought into operation by said power actuated operating means for reading and entering and setting up in the machine the two factors of a computation from a record, multiplying devices brought into operation automatically by the operating means and controlled by the aforesaid setup means for automatically multiplying the aforesaid entered factors and product representing means also controlled from the power actuated operating means for receiving and accumulating the resulting product.

33. A multiplying machine including a main operating means, factor receiving means, multiplying devices, product accumulating means and product recording devices, all operated automatically by said main operating means, means for causing the multiplying devices to be controlled automatically from the factor receiving means as each of a series of pairs of factors is entered, each entered pair being representative of the factors of an individual computation, the aforesaid control automatically initiating a multiplying operation after each pair of factors is entered and for causing the forming and accumulating of the product resulting from each computation upon the product setup means, and means operated by the main operating means for causing the product recording devices to be controlled by the product accumulating means and for causing a product recording operation to be effected for each computed product.

34. A record controlled and record making accounting machine with factor entry means controlled from records run through the machine, multiplying means controlled thereby and including accumulating means for products computed by the machine, means for controlling the product accumulating means to cause the latter to accumulate a series of separate products, and means controlled by the product accumulating means for punching upon a record which is run through the machine such summary of products so accumulated.

35. In a multiplying machine, the combination of a register including a series of number wheels severally engageable by clutches with a driving shaft, multiplying means controlling the number wheel clutches through electrical circuits, a switch with a plurality of contacts connecting circuits between the multiplying means and the number of wheel clutches, and means for advancing the switch step by step effective immediately upon the conclusion of each multiplication by a given order of multiplier and thereby disconnecting the circuit to the clutch of the lowest order of number wheels affected by such concluded multiplication.

36. A calculating machine comprising record feeding devices and record controlled factor receiving devices, multiplying devices controlled by said factor receiving devices, product accumulating means, operating means for said devices, means for causing operation of the multiplying devices under control of said receiving devices to form a succession of independent complete products of pairs of factors derived from each of a series of records, means for causing entry of said products in the accumulating means for accumulating together all of said products, and means for causing intermittent operation of feeding means following each complete multiplying operation whereby a series of records are fed through the machine and the sum of the products of their factors is obtained in a continuous operation of the machine.

37. In a calculating machine including in combination, multiplying devices and product receiving means, recording means controlled by said product receiving means to record a product upon a record, said recording means comprising digital recording elements arranged in a plurality of banks greater in number than the number of columns of the product to be recorded, a plurality of groups of selector means less in number than the number of banks of recording elements for selecting recording elements in cooperative banks, and means for adjusting all of said selector means as a unit relative to the banks of elements whereby the product may be recorded selectively in different fields of a stationary record.

38. In a multiplying machine, an impulse emitting commutator potentially capable of emitting all the timed impulses representative of right hand components of partial products to impulse transmitting lines, said commutator comprising a plurality of commutating sections which are less in number than the number of digits in the notation used in multiplication, means for rendering each of certain of said sections effective selectively for either one digit or another digit of the multiplier, said certain sections being common to a pair of multiplier digit values, and switching means cooperating with any of said certain sections and controlled in accordance with which digit of a pair is involved in the multiplication to control transmission from a selected section according to one of said pair of digits.

39. In a multiplying machine, an impulse emitting commutator potentially capable of emitting timed impulses representative of left hand components of product to a set of brushes, said commutator comprising a plurality of spots wired in individual selective circuit groups, certain of said spots in different circuit groups being traversed in succession by common brushes, and the spots in certain individual groups being capable of emitting impulses at different times of the commutator cycle, circuit switching means for variably affording current supply to said groups, and means variably settable in accordance with multiplier digit values to control said circuit switching means whereby current is supplied to said groups, singly or in combination, to emit differentially timed impulses representative of all of the left hand components of the product for a set multiplier digit value.

40. In a multiplying machine, an impulse emitting commutator potentially capable of emitting timed impulses representative of all right hand components of partial products, said commutator having a plurality of sections, means for selecting said sections for causing direct emission of timed impulses therefrom for certain multiplier digit values and for the complements of said digit values, and switching means rendered effective when said sections are selected in accordance with said complemental values to convert said directly timed impulses into complementally timed impulses.

41. A multiplying machine including multiplying devices, factor entry devices for receiving a series of pairs of factors from a succession of source means representing such factors and for controlling said multiplying devices, means for initiating operation of the machine, means for thereafter causing the multiplying devices to perform in automatic succession a series of independent complete multiplying computations involving successive pairs of factors, said means including devices for automatically restoring said entry devices and elements of the multiplying devices so that a pair of new factors can be received and a new multiplying computation performed after completion of an operation pertaining to a previous multiplying computation.

42. A machine according to claim 41 wherein the multiplying devices include a product receiving accumulator and resetting devices therefor, and wherein a power driven main operating means is provided, said main operating means operating said resetting devices, and also operating the restoring devices for the factor entry devices upon completion of their operations pertaining to one computation.

43. A record controlled calculating machine with a multiplying means, a record handling means for successively presenting a series of records for computation, and means for deriving all the factor data from the records and for causing the multiplying means to perform a multiplying computation for each successive record which is presented by said handling means, said multiplying means including a product receiving means for receiving the products of the multiplying computations, perforating means controlled by the product receiving means for punching upon each record the product of the factor amounts which appear on such record, and means for controlling said record handling means upon completion of a punching operation to feed a succeeding record through the deriving means and to the perforating means.

44. A record controlled calculating machine comprising multiplying means, a record handling means for successively presenting a series of records for computation, means for deriving pairs of factors from the record, a pair of factor storing means for receiving said pairs of factors and for controlling the multiplying means to perform a multiplication for each successive record which is presented by said handling means, a product receiving accumulator, recording means controlled by the product accumulator for recording upon each record the product of the factors appearing thereon, and instrumentalities for causing resetting of said factor storing means, and said product accumulator upon completion of their respective control functions relating to each record.

45. A record controlled calculating machine with a multiplying means, a record handling means for successively presenting a series of records for computation, and means for deriving all the factor data from the records and for causing the multiplying means to perform a multiplying computation for each successive record which is presented by said handling device, said multiplying means including product receiving means for receiving the products of the multiplying computations, means controlled by the product receiving means for recording upon each record the product of the factor amounts which appear upon such record.

46. A card controlled calculating machine with two factor entry receiving means for receiving pairs of factors of multiplying computations under control of perforations in a series of record cards passing through the machine, means controlled by said factor entry receiving means for effecting multiplication of said pairs of factors, resetting means for said receiving means normally functioning upon completion of a multiplication pertaining to each card, means for disabling the resetting means for one of said factor receiving means so that when only the leading card of a series bears representations of said one factor, the receiving means therefor will retain said factor unchanged throughout an entire series of computations pertaining to a plurality of cards, the other factor of each multiplication in the series being a factor which may change from card to card in accordance with the representation thereof on said cards.

47. A machine according to claim 44 wherein means for disabling the product accumulator resetting instrumentalities are provided to enable said accumulator to accumulate the separately computed complete products whereby summations of independently computed products will be recorded on successive records.

48. A machine according to claim 44 wherein means are provided for disabling the product accumulator resetting instrumentalities, and wherein further means are provided to disable the recording means.

49. A machine according to claim 44 wherein means are provided for disabling the resetting instrumentalities for one of the storing means.

JAMES W. BRYCE.